US012770183B2

(12) United States Patent
Ishida

(10) Patent No.: US 12,770,183 B2
(45) Date of Patent: Oct. 20, 2026

(54) MANAGEMENT SYSTEM FOR HOURLY RENTAL FACILITY

(71) Applicant: TAISHO SKY BUILDING, INC., Tokyo (JP)

(72) Inventor: Kazuharu Ishida, Tokyo (JP)

(73) Assignee: TAISHO SKY BUILDING, INC., Tokyo (JP)

( * ) Notice: Subject to any disclaimer, the term of this patent is extended or adjusted under 35 U.S.C. 154(b) by 0 days.

(21) Appl. No.: 18/449,721

(22) Filed: Aug. 15, 2023

(65) Prior Publication Data

US 2023/0385921 A1 Nov. 30, 2023

Related U.S. Application Data

(63) Continuation of application No. PCT/JP2021/011875, filed on Mar. 23, 2021.

(51) Int. Cl.
*G06Q 30/0645* (2023.01)
*G06Q 10/02* (2012.01)

(52) U.S. Cl.
CPC ......... *G06Q 30/0645* (2013.01); *G06Q 10/02* (2013.01)

(58) Field of Classification Search
CPC ........................... G06Q 30/0645; G06Q 10/02
See application file for complete search history.

(56) References Cited

U.S. PATENT DOCUMENTS 6,612,489 B2 * 9/2003 McCormick ........ E05B 19/0005 235/382
2015/0179006 A1 * 6/2015 Von Zurmuehlen .... G07F 17/12 340/5.54

(Continued)

FOREIGN PATENT DOCUMENTS

JP 2002-304559 A 10/2002
JP 2008-158705 A 7/2008

(Continued)

OTHER PUBLICATIONS

Air-Locker. (n.d.). https://air-locker.com/wp-content/uploads/2020/05/airlocker-brochure-enterprise-FINAL.pdf (Year: 2020).*

(Continued)

*Primary Examiner* — Shannon S Campbell
*Assistant Examiner* — Manal A. Alsamiri
(74) *Attorney, Agent, or Firm* — MORGAN, LEWIS & BOCKIUS LLP

(57) ABSTRACT

An hourly rental facility management system includes a management server for managing information with connection to an Internet, a room that is connected to the management server via the Internet in such a manner as to be able to communicate with each other, a user input means, and a storage means including storage compartments having a predetermined storage space that stores goods. The management server includes a storage unit, a facility reservation accepting unit that accepts user information of a user who uses the room being an hourly rental facility, and facility reservation information, and a storage reservation accepting unit that accepts a reservation for the storage means as storage reservation information. The storage reservation accepting unit includes an availability display unit that causes a display to display the availability of the storage means.

14 Claims, 12 Drawing Sheets

(56) References Cited

U.S. PATENT DOCUMENTS

| | | | | |
|---|---|---|---|---|
| 2015/0186840 | A1* | 7/2015 | Torres | A47B 81/00 705/339 |
| 2018/0033235 | A1* | 2/2018 | Dotterweich | G07F 17/12 |
| 2018/0285967 | A1* | 10/2018 | Gilbey | G06Q 20/145 |
| 2019/0213540 | A1* | 7/2019 | Petroski | G06Q 10/0837 |
| 2019/0259232 | A1* | 8/2019 | Nandakumar | G07C 9/00896 |
| 2019/0333304 | A1* | 10/2019 | Flynn | G06Q 20/327 |
| 2020/0387862 | A1* | 12/2020 | Irwin | G07F 9/001 |
| 2021/0174621 | A1* | 6/2021 | Stevenot | H04W 4/30 |
| 2022/0092487 | A1 | 3/2022 | Ishida | |
| 2022/0092902 | A1* | 3/2022 | Kashiwakura | G07C 9/37 |
| 2022/0108234 | A1 | 4/2022 | Ishida | |
| 2022/0374973 | A1* | 11/2022 | Fort | G07F 17/12 |

FOREIGN PATENT DOCUMENTS

| | | | |
|---|---|---|---|
| JP | 2012-185568 | A | 9/2012 |
| JP | 2018-055401 | A | 4/2018 |
| JP | 2018-144946 | A | 9/2018 |
| JP | 2019-016190 | A | 1/2019 |
| JP | 2019-032737 | A | 2/2019 |
| JP | 2019-037389 | A | 3/2019 |
| JP | 2020-154572 | A | 9/2020 |
| TW | 202044167 | A | 12/2020 |
| TW | 202046214 | A | 12/2020 |
| WO | WO2019/0229964 | A1 | 12/2019 |

OTHER PUBLICATIONS

Office Action issued on Jan. 22, 2024 for corresponding Taiwanese Patent Application No. 111110574, 22 pgs.

Taisho Sky Building, Inc., International Search Report and Written Opinion dated Jun. 15, 2021 for PCT/JP2021/011875, 10 pgs.

Office Action mailed on Sep. 21, 2021 for the corresponding Japanese Patent Application No. 2021-540078, 10 pgs.

Notice of Launch of Locker Rental (Charged) Service, SMG ACCEA Rental Conference Rooms, [online], Aug. 26, 2019 [retrieved on Jun. 2, 2021], Internet: <URL: https://osaka-conference.com/news/post_6/>, 4 pgs.

Office Action mailed on Jun. 17, 2026 for the corresponding Chinese Patent Application No. CN202180094988-0, 28 pgs.

* cited by examiner

MANAGEMENT SYSTEM FOR HOURLY RENTAL FACILITY

RELATED APPLICATIONS

The present application is a continuation of International Patent Application No. PCT/JP2021/011875, filed Mar. 23, 2021, which is hereby incorporated by reference in its entirety.

TECHNICAL FIELD

The present disclosure relates to an hourly rental facility management system that sets usage time and rents facilities to users.

BACKGROUND

A system has been conventionally proposed which rents facilities such as buildings, offices, and vacant meeting rooms of hotels to general users. For example, a rental booth management system described in Patent Literature 1 includes a plurality of booths for rent, power supplies each provided to a respective booth, and a management apparatus that manages each of the booths. The management apparatus includes an input unit that accepts an input of the selection of a booth to be used, and an input of usage time of the selected booth, a receiver for a usage fee, and a controller. The controller performs control to calculate the usage fee, control to store input from the input unit, in a storage unit, and control to supply power to the booth. In control to calculate the usage fee, the usage fee is calculated from the booth and the usage time, which are inputted from the input unit. In control to store input from the input unit in the storage unit, it is checked that the receiver has received the usage fee of the booth, and then the booth and the usage time of the booth are stored in the storage unit. In control to supply power to the booth, power is supplied to the power supply of the booth only during the usage time stored in the storage unit. Moreover, a locker facility is annexed to the management apparatus. An operating unit provided to the management apparatus is designed to be capable of performing both of an operation for use of the rental booth and an operation for use of the locker facility.

When an hourly rental facility such as a rental booth is used, it may be desired to store baggage, a device to be used in the hourly rental facility, and the like in a storage means such as a locker. However, in some conventional rental booth management systems, when the rental booth and the locker facility are used, it is necessary to take the trouble to go to the management apparatus. In addition, a reservation for the locker facility is not supposed to be made in advance. Hence, there is a problem that when the rental booth is used, the locker facility may be already fully used by other users so that the locker facility may not be available when desired.

SUMMARY

An object of the present disclosure is to provide an hourly rental facility management system that can reserve a storage means in addition to an hourly rental facility.

An hourly rental facility management system of the present disclosure is an hourly rental facility management system including an hourly rental facility to rent the facility to a user after usage time is set, the hourly rental facility management system including: a management server for managing information with connection to a communication line; a user input means configured to accept information input by the user into the management server; and a storage means including at least one storage compartment having a predetermined storage space that stores goods, in which the hourly rental facility, the user input means, and the storage means are connected to the management server via the communication line in such a manner as to be able to communicate with each other, the user input means includes: an input unit configured to input information; and a display configured to display information, the management server includes: a storage unit configured to store information; a facility reservation accepting unit configured to accept, via the input unit, user information being information related to the user who uses the hourly rental facility, and facility reservation information being information that is related to a reservation for the hourly rental facility and includes a reservation date and time of the hourly rental facility, and then to store the user information and the facility reservation information in the storage unit; and a storage reservation accepting unit configured to accept, via the input unit, storage reservation information being information that is related to a reservation for the storage means and includes a reservation date and time of the storage means, and then to store the storage reservation information in the storage unit in association with the user information, and the storage reservation accepting unit includes an availability display unit configured to acquire the storage reservation information from the storage unit and then to cause the display to display availability of the storage means.

According to the present disclosure, the hourly rental facility management system includes the availability display unit, and the storage reservation accepting unit that stores the storage reservation information in the storage unit in association with the user information. Therefore, when reserving the hourly rental facility, the user can check the availability of the storage means, and reserve the storage means in addition to the hourly rental facility by use of the common user information. Therefore, the hourly rental facility management system can reserve the storage means in addition to the hourly rental facility.

At this point in time, preferably, the storage means includes a plurality of the storage compartments, the storage unit stores attribute information related to attributes of the plurality of storage compartments, and the storage reservation accepting unit includes: a storage compartment information display unit configured to acquire the attribute information from the storage unit and then to cause the display to display the attribute information of the plurality of storage compartments on a storage compartment basis; and a storage compartment selection unit configured to allow the user to make a selection from the storage compartments displayed on the display.

The attribute information is information related to, for example, the arrangement of the plurality of storage compartments in the storage means, the installed locations, shapes, and presence or absence of adjustment functions for, for example, cold storage, frozen storage, temperature, and humidity, of the storage compartments, and the sizes of the storage compartments. According to such a configuration, the user can select and reserve a storage compartment having an attribute that the user desires to use, from the plurality of storage compartments displayed on the display.

Alternatively, preferably, the storage means includes a plurality of the storage compartments, the storage unit stores attribute information related to attributes of the plurality of storage compartments, and the storage reservation accepting unit includes: an attribute information display unit configured to acquire the attribute information from the storage unit and then to cause the display to display the attribute information of the plurality of storage compartments on an attribute basis; an attribute selection unit configured to allow the user to make a selection from the attributes displayed on the display; and a storage compartment determination unit configured to determine the storage compartment that is allowed to be used by the user, on the basis of the attribute selected by the user.

According to such a configuration, the user selects the attribute of the storage compartment that the user desires to use from the plurality of storage compartments displayed on the display and, accordingly, can reserve the storage compartment having the desired attribute. Moreover, the storage reservation accepting unit includes the storage compartment determination unit. Therefore, the storage compartment to be used by the user can be assigned and determined on the basis of the attribute selected by the user.

At this point in time, preferably, the storage reservation accepting unit accepts a reservation for the storage means also for a reservation date and time different from the reservation date and time accepted by the facility reservation accepting unit.

According to such a configuration, the storage means can be reserved also for a reservation date and time different from the reservation date and time of the hourly rental facility. Therefore, for example, the user can go out with his/her baggage left until the reservation date and time of the hourly rental facility, and store a necessary device and the like until the user uses the hourly rental facility next time.

At this point in time, preferably, the storage means includes a storage-side lock device configured to be released by a release key, and the management server includes: a delivery accepting unit configured to accept delivery of goods to the storage means reserved by the user; a release key issuing unit configured to issue a release key that releases the storage-side lock device of the storage means being a delivery destination; and a delivery information notification unit configured to notify the storage means being the delivery destination, and the release key to a carrier related to the delivery of the goods.

According to such a configuration, the management server includes the delivery accepting unit and the delivery information notification unit. Therefore, the user can have the goods delivered to the reserved storage means. Moreover, for example, the user does not need to bring, for example, a necessary device that is used in the hourly rental facility, and can deliver the device to a specified storage means.

At this point in time, preferably, the delivery accepting unit accepts pickup information related to pick up of the goods, and the delivery information notification unit notifies the pickup information to the carrier related to the delivery of the goods.

According to such a configuration, the carrier related to the delivery of the goods can pick up the goods on the basis of the pickup information. Therefore, the convenience of the hourly rental facility management system can be improved.

At this point in time, preferably, the storage means includes a storage-side lock device configured to be released by a release key, and the management server includes: a collection accepting unit configured to accept collection of goods in the storage means reserved by the user; a release key issuing unit configured to issue a release key that releases the storage-side lock device of the storage means being a collection destination; and a collection information notification unit configured to notify the storage means being the collection destination, and the release key to a carrier related to the collection of the goods.

According to such a configuration, the management server includes the collection accepting unit and the collection information notification unit. Therefore, the user can have the goods in the reserved storage means collected. Moreover, for example, the user does not need to take, for example, a necessary device used in the hourly rental facility back with him/her and can have the device collected from the reserved storage means.

At this point in time, preferably, the collection accepting unit accepts shipping information related to shipping of the goods, and the collection information notification unit notifies the shipping information to the carrier related to the collection of the goods.

According to such a configuration, the carrier related to the collection of the goods can ship the goods on the basis of the shipping information. Therefore, the convenience of the hourly rental facility management system can be improved.

At this point in time, preferably, the storage means includes a storage-side lock device configured to be released by a release key, the management server includes: a delivery accepting unit configured to accept delivery of goods to the storage means reserved by the user; a release key issuing unit configured to issue a release key that releases the storage-side lock device of the storage means being a delivery destination; a delivery information notification unit configured to notify the storage means being the delivery destination, and the release key to a carrier related to the delivery of the goods; a collection accepting unit configured to accept collection of goods in the storage means reserved by the user; a release key issuing unit configured to issue a release key that releases the storage-side lock device of the storage means being a collection destination; a collection information notification unit configured to notify the storage means being the collection destination, and the release key to a carrier related to the collection of the goods; a rental information acquisition unit configured to acquire rental information related to an available rental; a rental information display unit configured to cause the display to display the rental information; and a rental selection unit configured to allow the user to select a rental, the delivery accepting unit accepts delivery of the rental as the goods, the delivery information notification unit notifies the storage means being a delivery destination, and a release key to a rental company, the collection accepting unit accepts collection of the rental as the goods, and the collection information notification unit notifies the storage means being a collection destination, and a release key to the rental company.

The rental information acquisition unit may acquire the rental information from the storage unit where the rental information is stored, or may acquire the rental information from a management server of the company.

According to such a configuration, the user can select and reserve a rental that the user desires to use, from the rentals displayed on the display. Moreover, the user can have the rental delivered to the reserved storage means, and have the rental in the reserved storage means collected.

At this point in time, preferably, the release key issuing unit includes: a user-specific release key issuing unit configured to issue the release key of the storage means reserved by the user, as a user-specific release key, to the user; and a carrier-specific release key issuing unit configured to issue, to the carrier, a carrier-specific release key that the carrier uses upon releasing the storage means reserved by the user, and the user-specific release key and the carrier-specific release key are different.

According to such a configuration, the release key issuing unit includes the user-specific release key issuing unit and the carrier-specific release key issuing unit. Therefore, the user-specific release key is issued to the user, and the carrier-specific release key different from the user-specific release key is issued to the carrier. As a result, troubles such as the carrier taking the user's goods away can be prevented. Moreover, the hourly rental facility management system can promote an improvement in security.

At this point in time, preferably, the management server includes a carrier-specific release key setting unit configured to activate or deactivate the carrier-specific release key on the basis of a predetermined condition.

According to such a configuration, the carrier-specific release key is activated or deactivated on the basis of the predetermined condition. Therefore, the carrier-specific release key can be protected against use by the carrier except when necessary to be used. The security of the storage means can be improved.

At this point in time, preferably, the carrier-specific release key setting unit deactivates the carrier-specific release key at times other than a specified time.

According to such a configuration, the carrier-specific release key setting unit deactivates the carrier-specific release key at times other than the specified time. Therefore, the security of the storage means can be improved.

At this point in time, preferably, the carrier-specific release key setting unit deactivates the carrier-specific release key in response to use of the carrier-specific release key.

According to such a configuration, the carrier-specific release key setting unit deactivates the carrier-specific release key that has once been used on the storage means. Therefore, the carrier-specific release key can be protected against use by the carrier except when necessary to be used. The security of the storage means can be improved.

At this point in time, preferably, the management server includes a user-specific release key setting unit configured to activate or deactivate the user-specific release key on the basis of a predetermined condition, and the user-specific release key setting unit sets the user-specific release key to active after the carrier-specific release key is deactivated.

According to such a configuration, the management server includes the user-specific release key setting unit. Therefore, the user-specific release key becomes active (available) after the carrier-specific release key becomes inactive. The carrier-specific release key can be made unavailable. Consequently, even if only one release key can be set on the storage-side lock device, the release key can be protected against use by the carrier except when necessary to be used, and the security of the storage means can be improved.

At this point in time, preferably, the hourly rental facility includes a facility-side lock device configured to be released by a release key, the user-specific release key issuing unit issues the user-specific release key including a character string, the user-specific release key being capable of releasing both of the facility-side lock device and the storage-side lock device, and the carrier-specific release key issuing unit configured to issue the carrier-specific release key including a part of the character string in the user-specific release key.

A description is given of a specific example where the carrier-specific release key is assumed to include a part of the character string of the user-specific release key. For example, the user-specific release key issuing unit issues a character string "AB0123" as the user-specific release key for the facility-side lock device and the storage-side lock device. The carrier-specific release key issuing unit issues a character string "CD0123" as the carrier-specific release key for the storage-side lock device. In this manner, the carrier-specific release key includes a part, "0123", of the character string in the user-specific release key.

The facility-side lock device accepts the input of a six-character string. The facility-side lock device is released when the six-character string that has been inputted matches all the six characters in the character string, "AB0123", of the user-specific release key. The storage-side lock device accepts the input of a six-character string as in the facility-side lock device. However, in contrast to the facility-side lock device, the storage-side lock device is released when the last four characters of the inputted character string matches "0123".

In other words, the facility-side lock device can be released only by the character string, "AB0123", of the user-specific release key, and the storage-side lock device can be released by both of the character string, "AB0123", of the user-specific release key and the character string, "CD0123", of the carrier-specific release key.

According to such a configuration, the facility-side lock device cannot be released by the carrier-specific release key. Therefore, an improvement in security can be promoted.

At this point in time, preferably, the hourly rental facility includes a facility-side lock device configured to be released by a release key, the storage means includes a storage-side lock device configured to be released by a release key, the management server includes a release key issuing unit configured to issue a release key that releases the storage-side lock device, and the release key issuing unit issues a release key capable of releasing both of the facility-side lock device and the storage-side lock device.

According to such a configuration, the release key issuing unit issues the release key that can release both of the facility-side lock device and the storage-side lock device. Therefore, the user can release both of the facility-side lock device and the storage-side lock device with one release key. As a result, an improvement in convenience can be promoted.

At this point in time, preferably, the management server includes a changer configured to change at least one of a usage fee of the storage means and a usage period of the storage means on the basis of a predetermined condition.

According to such a configuration, the changer can change at least one of the usage fee of the storage means and the usage period of the storage means on the basis of the predetermined condition such as a usage attribute indicating that, for example, the user is a VIP (Very Important Person), a usage situation, and a use season, which allows encouraging the user to use the hourly rental facility.

At this point in time, preferably, the storage means includes a first storage means installed at a predetermined location, and a second storage means installed at a location different from the first storage means, the storage unit stores information on locations where the first storage means and the second storage means are installed, the storage reservation accepting unit includes a location information display unit configured to acquire the location information from the storage unit and then to cause the display to display the location information, and the availability display unit causes the display to display availability of the first and the second storage means.

According to such a configuration, the availability display unit displays the availability of the first and second storage means on the display. Therefore, for example, the user can also reserve, for example, the storage means installed with the hourly rental facility, or the storage means installed in a station yard in association with the hourly rental facility. Moreover, the user can select and reserve the first or second storage means.

At this point in time, preferably, the management server includes: a total calculator configured to calculate the total of the usage fee of the storage means and a usage fee of the hourly rental facility, and a payment accepting unit configured to accept a payment for the total of the usage fees calculated by the total calculator.

According to such a configuration, the user can check the total of the usage fees of the storage means and the hourly rental facility, and pay the usage fees in one payment.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

DETAILED DESCRIPTION

First Embodiment

Figure 1:
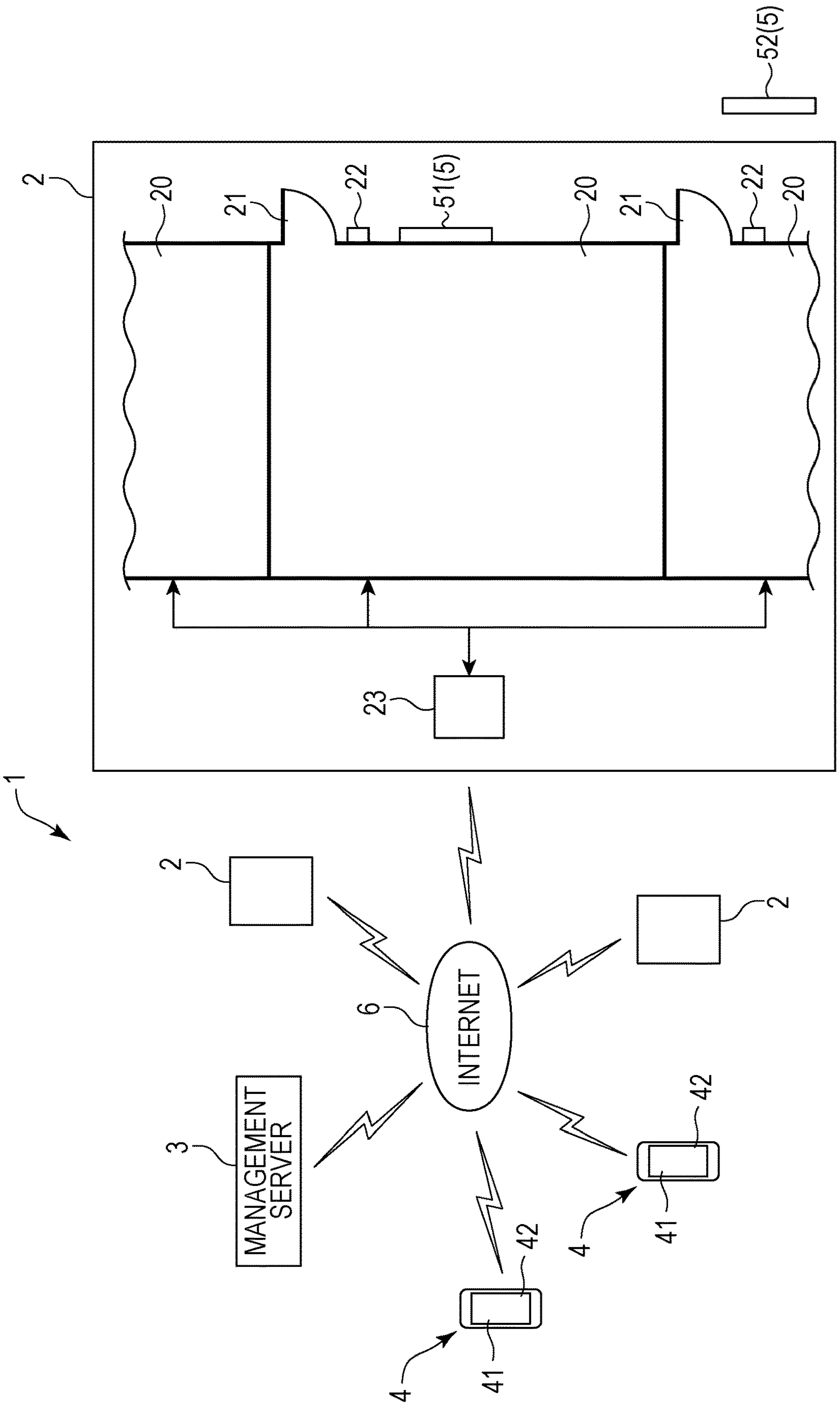
FIG. 1 is a schematic configuration diagram of an hourly rental facility management system according to a first embodiment of the present disclosure.

A first embodiment of the present disclosure is described below on the basis of the drawings. FIG. 1 is a schematic configuration diagram of an hourly rental facility management system 1 according to the first embodiment of the present disclosure. As illustrated in FIG. 1, the hourly rental facility management system 1 includes a building 2 including hourly rental facilities to rent the facilities to users after usage time is set, a management server 3 for managing information, a user input means 4 that accepts information input by the user into the management server 3, and a storage means 5 that stores goods. The building 2, the user input means 4, and the storage means 5 are connected to the management server 3 via an Internet 6 being a public network as a communication line in such a manner as to be able to communicate with each other.

The building 2 includes a plurality of rooms 20 as the hourly rental facilities that are facilities to be rented to users after the usage time is set. Each of the rooms 20 includes an entry/exit 21, and a facility-side lock device 22 that is released by a release key for locking and unlocking the entry/exit 21. The rooms 20 include a communication terminal device 23, such as a modem or router, connected via a LAN (Local Area Network). The communication terminal device 23 is connected to the management server 3 via the Internet 6. By using the user input means 4, a user can access the management server 3 via the Internet 6, search for the room 20 and the storage means 5 that the user desires to use, specify usage time, and make reservations for the room 20 and the storage means 5.

The user input means 4 is, for example, a mobile phone, a smartphone, or a personal computer that is possessed by a user who desires to use the building 2. In the embodiment, the user input means 4 is a smartphone that accepts information input by the user into the management server 3. The user input means 4 includes an input unit 41 that inputs information, and a display 42 that displays information. The input unit 41 is a touchscreen of the smartphone. The user inputs information necessary to make reservations by operating the touchscreen being the input unit 41. The display 42 is a liquid crystal screen of the smartphone. The user searches for the room 20 and the storage means 5 that the user desires to use, on the basis of information that is displayed on the display 42 via the management server 3, and can make reservations.

The storage means 5 includes a first storage means 51 installed at a predetermined location, and a second storage means 52 installed at a location different from the first storage means 51. The first storage means 51 is located near the plurality of rooms 20 in the building 2. The second storage means 52 is located not in the building 2 where the first storage means 51 is located but in a station yard near the building 2.

Figure 2:
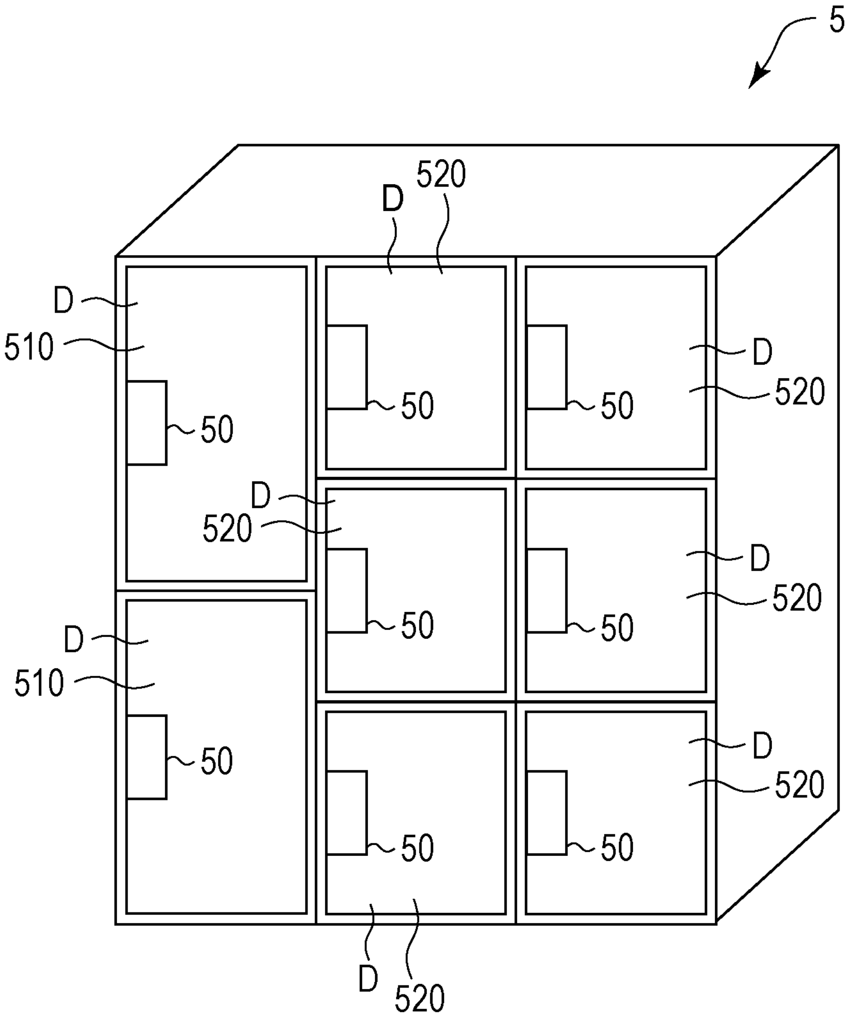
FIG. 2 is a schematic diagram illustrating a storage means in the hourly rental facility management system.

FIG. 2 is a schematic diagram illustrating the storage means 5 in the hourly rental facility management system 1. As illustrated in FIG. 2, the storage means 5 is lockers including a plurality of storage compartments 510 and 520 each having a predetermined storage space that stores goods. Specifically, the storage means 5 includes the first storage compartment 510 having a predetermined storage space, and the second storage compartment 520 having a smaller storage space than the first storage compartment 510. The first storage compartment 510 has a storage space of a size that can store, for example, a golf bag. The second storage compartment 520 has a storage space of a size that can store, for example, a backpack.

The first storage compartment 510 and the second storage compartment 520 each include a door D, and a storage-side lock device 50 for locking and unlocking the door D. The storage-side lock device 50 can be unlocked by a release key that is issued by the management server 3, and is locked automatically by closing the door D. The storage-side lock device 50 may not be locked automatically by closing the door D, but may be locked manually, or by remote control via the management server 3.

Figure 3:
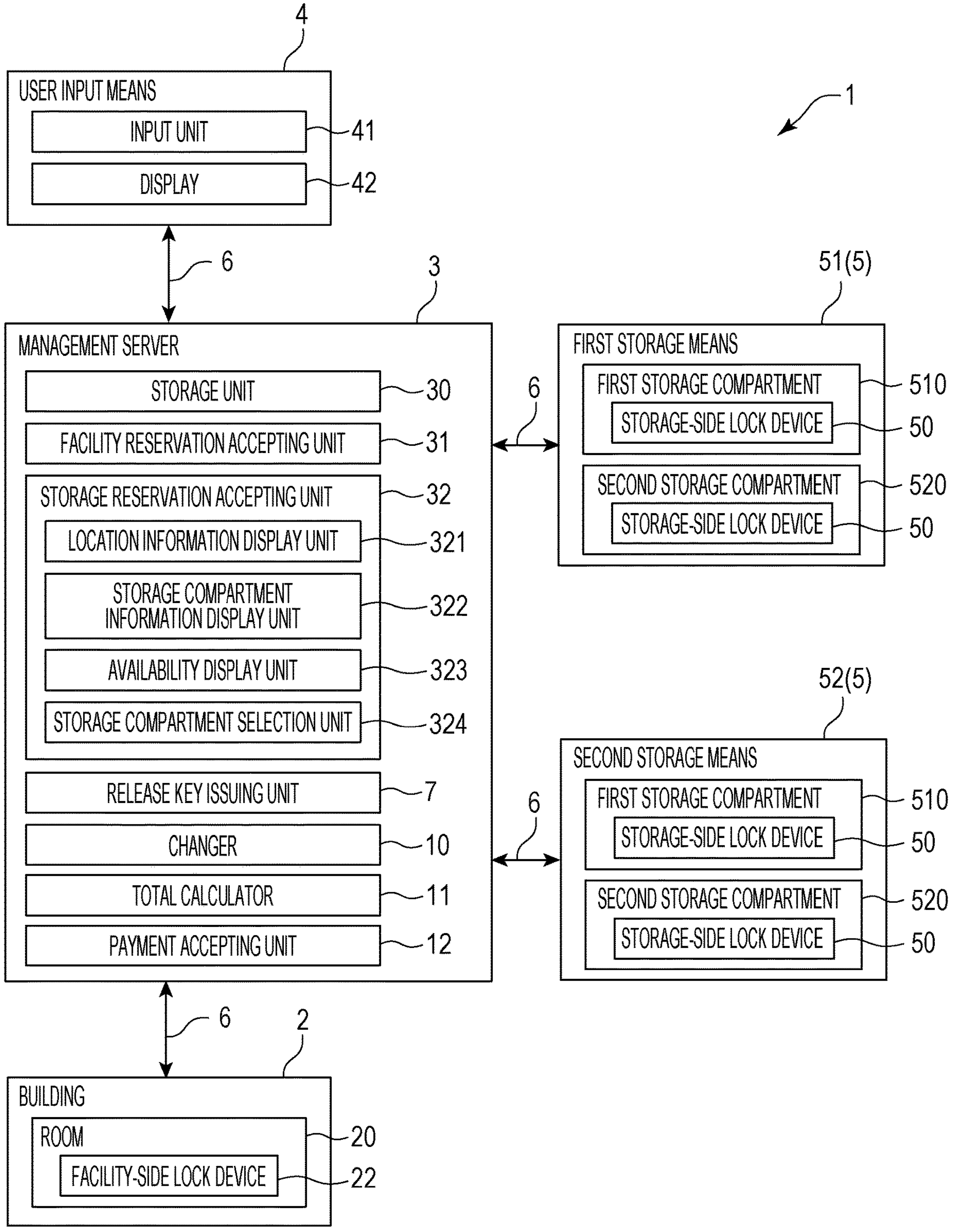
FIG. 3 is a block diagram illustrating the configuration of the hourly rental facility management system.

FIG. 3 is a block diagram illustrating the configuration of the hourly rental facility management system 1. The management server 3 includes a CPU (Central Processing Unit) and memory, and executes information processing in accordance with predetermined programs stored in the memory. As illustrated in FIG. 3, the management server 3 includes a storage unit 30, a facility reservation accepting unit 31, a storage reservation accepting unit 32, a release key issuing unit 7, a changer 10, a total calculator 11, and a payment accepting unit 12.

The storage unit 30 is, for example, an HDD (Hard Disk Drive) that stores information accepted via the user input means 4. In the embodiment, the storage unit 30 is configured, including an HDD, but may be configured, including an SSD (Solid State Drive) or a NAS (Network Attached Storage), or may be configured, including a cloud service. Moreover, each function of the management server 3 is executed in accordance with a program stored in the storage unit 30, but may be configured, including a respective independent device, or may be configured by cloud computing.

The facility reservation accepting unit 31 accepts, via the input unit 41, user information being information related to a user who uses the room 20, and facility reservation information being information that is related to a reservation for the room 20 and includes a reservation date and time of the hourly rental facility. Moreover, the facility reservation accepting unit 31 stores the user information and the facility reservation information in the storage unit 30. The user information is information of the user that is used when a reservation is made, such as the name and address of the user. Moreover, the facility reservation information is information related to the room 20, such as a reservation date and time and period of the room 20, and the size and floor plan of the room 20 to be reserved. The user inputs the user information and the facility reservation information on the input unit 41, and can reserve the room 20 via the facility reservation accepting unit 31.

The storage reservation accepting unit 32 accepts, via the input unit 41, storage reservation information being information that is related to a reservation for the storage means 5 and includes a reservation date and time of the storage means 5. Moreover, the storage reservation accepting unit 32 stores the storage reservation information in the storage unit 30 in association with the user information.

After the room 20 is reserved by the facility reservation accepting unit 31, the storage reservation accepting unit 32 makes a reservation for the storage means 5 in association with the user information inputted by the facility reservation accepting unit 31. The storage reservation accepting unit 32 can accept a reservation for the same date and time as the reservation date and time accepted by the facility reservation accepting unit 31, and also can accept a reservation for the storage means 5 for a reservation date and time different from the reservation date and time accepted by the facility reservation accepting unit 31.

The storage reservation accepting unit 32 includes a location information display unit 321, a storage compartment information display unit 322, an availability display unit 323, and a storage compartment selection unit 324. The storage unit 30 stores information on locations where the first storage means 51 and the second storage means 52 are installed. The location information is a location (address) of each of the installed first storage means 51 and the second storage means 52.

The location information display unit 321 acquires the location information from the storage unit 30, and causes the display 42 to display the location information. The storage reservation accepting unit 32 causes the location information display unit 321 to display the location information of the first storage means 51 and the second storage means 52 and therefore allows the user to select which storage means 5, the first storage means 51 or the second storage means 52, he/she desires to use.

The storage compartment information display unit 322 causes the display 42 to display attribute information of the plurality of storage compartments 510 and 520 for each of the storage compartments 510 and 520. Specifically, the storage unit 30 stores attribute information related to the attributes of the plurality of storage compartments 510 and 520 of the storage means 5. Hence, the storage compartment information display unit 322 acquires the attribute information from the storage unit 30, and causes the display 42 to display the attribute information.

The attribute information of the plurality of storage compartments 510 and 520 is information related to, for example, the arrangement of the plurality of storage compartments 510 and 520 of the storage means 5, the installed locations, shapes, and presence or absence of adjustment functions for, for example, cold storage, frozen storage, temperature, and humidity, of the storage compartments 510 and 520, and the sizes of the storage compartments.

In the embodiment, the storage compartment information display unit 322 displays, on the display 42, the arrangement of the plurality of storage compartments 510 and 520 of the storage means 5 as the attribute information of the plurality of storage compartments 510 and 520, and a difference in the size of the storage space between the plurality of storage compartments 510 and 520 as the attribute information. The availability display unit 323 acquires the storage reservation information of the storage means 5 from the storage unit 30, and causes the display 42 to display the availability of the storage means 5. The storage compartment selection unit 324 allows the user to make a selection from the storage compartments 510 and 520 displayed on the display 42.

Specifically, first, the location information display unit 321 and the availability display unit 323 display, on the display 42, the location information where the first storage means 51 and the second storage means 52 are installed, and the availability of the storage means 5, which are stored in the storage unit 30. The user selects the storage means 5 that the user desires to reserve, on the basis of the information displayed on the display 42.

Next, the storage compartment information display unit 322 and the availability display unit 323 display, on the display 42, the arrangement of the plurality of storage compartments 510 and 520, the difference in the size of the storage space between the plurality of storage compartments 510 and 520, and the availability, which are stored in the storage unit 30. The user selects the storage compartment 510 or 520 that the user desires to reserve, on the basis of the information displayed on the display 42. The storage compartment selection unit 324 stores, in the storage unit 30, the information on the storage compartment 510 or 520 that has been selected by the user via the input unit 41. In this manner, the storage reservation accepting unit 32 makes a reservation for the storage means 5 on the basis of the information inputted by the user.

The release key issuing unit 7 issues, to the user, a release key that can release both of the facility-side lock device 22 of the room 20 reserved by the user and the storage-side lock device 50 of the storage means 5 reserved by the user. Examples of the release key include a personal identification number that is issued to the user input means 4 by the management server 3, and an optical code such as a barcode or a QR code (registered trademark). It is configured in such a manner that the user can release the facility-side lock device 22 of the room 20 and the storage-side lock device 50 of the storage means 5 by use of a unique release key. In the embodiment, for example, a personal identification number, or an optical code such as a barcode or QR code (registered trademark) is employed as the release key. However, biometric recognition such as facial recognition, fingerprint recognition, or retina recognition may be employed. Anything that can release the facility-side lock device 22 and the storage-side lock device 50 is acceptable.

The changer 10 changes the usage fee of the storage means 5, and the usage period of the storage means 5 on the basis of predetermined conditions. Examples of the predetermined conditions include seasonal conditions such as peak season and off-season, and user attributes based on the usage situation of the user. The usage fee of the storage means 5 and the usage period of the storage means 5 are changed to allow, for example, giving a discount to a VIP member, and extending the usage period of the storage means 5 during off-season. Therefore, the changer 10 enables the efficient operation of the hourly rental facility management system 1.

The total calculator 11 calculates the total of the usage fees of the storage means 5 and the room 20. The payment accepting unit 12 accepts a payment for the total usage fee calculated by the total calculator 11. The total calculator 11 calculates the total of the usage fees of the storage means 5 and the room 20, and displays the total on, for example, the display 42. Therefore, the user can easily find the total of the usage fees of the storage means 5 and the room 20. Moreover, the payment accepting unit 12 can accept a payment for the total usage fee calculated by the total calculator 11 by, for example, electronic money. The payment accepting unit 12 may accept a payment not by electronic money but by displaying, on the display 42, the usage fee calculated by the total calculator 11 and also a payee's bank account number. Moreover, the usage fee of the storage means 5 and the usage fee of the room 20 may be paid separately.

Figure 4:
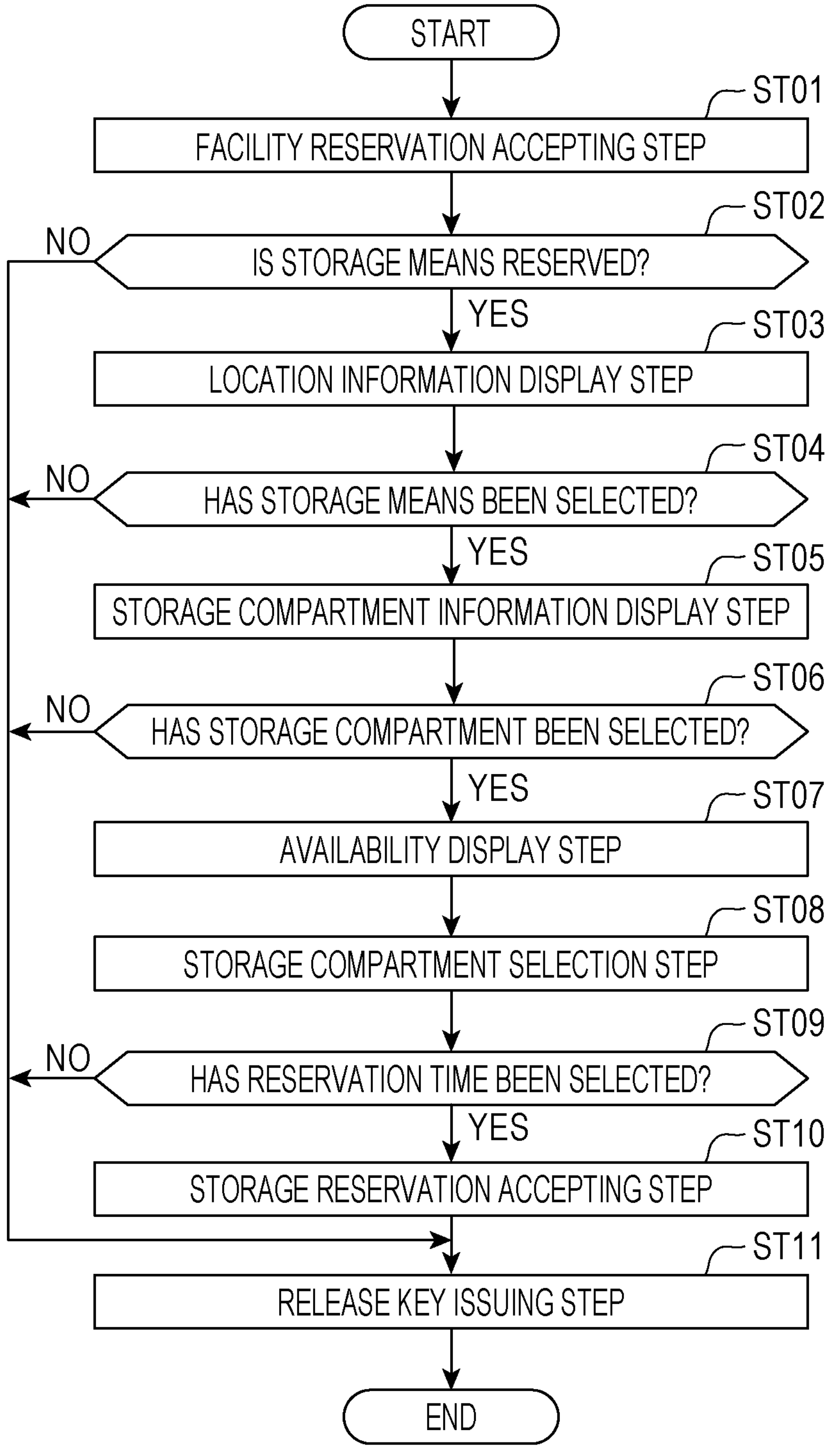
FIG. 4 is a flowchart illustrating the operation of making reservations in the hourly rental facility management system.
Figure 5:
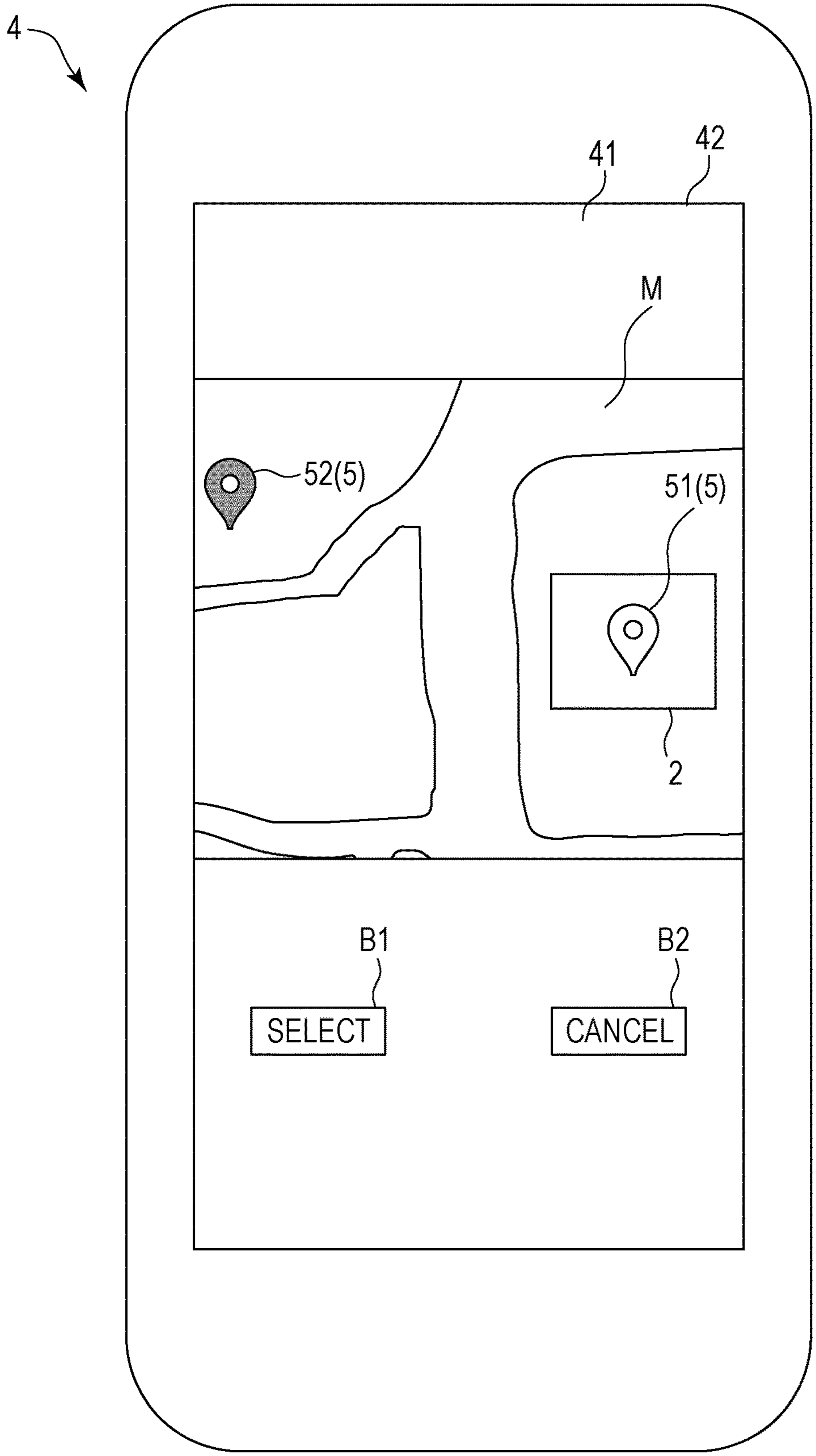
FIG. 5 is a schematic diagram illustrating a state where location information of the storage means in the hourly rental facility management system is being displayed on a display.
Figure 6:
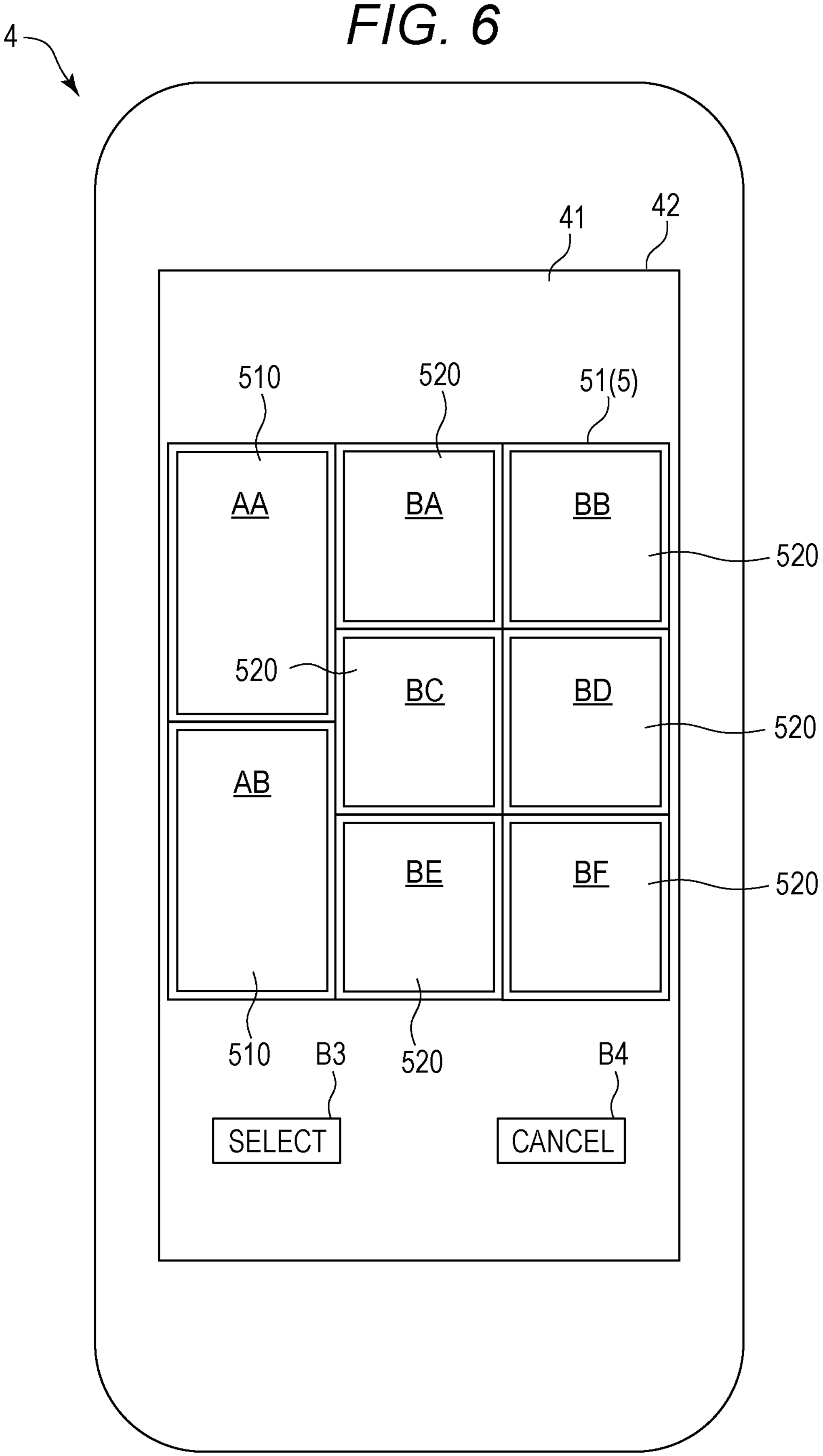
FIG. 6 is a schematic diagram illustrating a state where attribute information of a plurality of storage compartments in the hourly rental facility management system is being displayed on the display.
Figure 7:
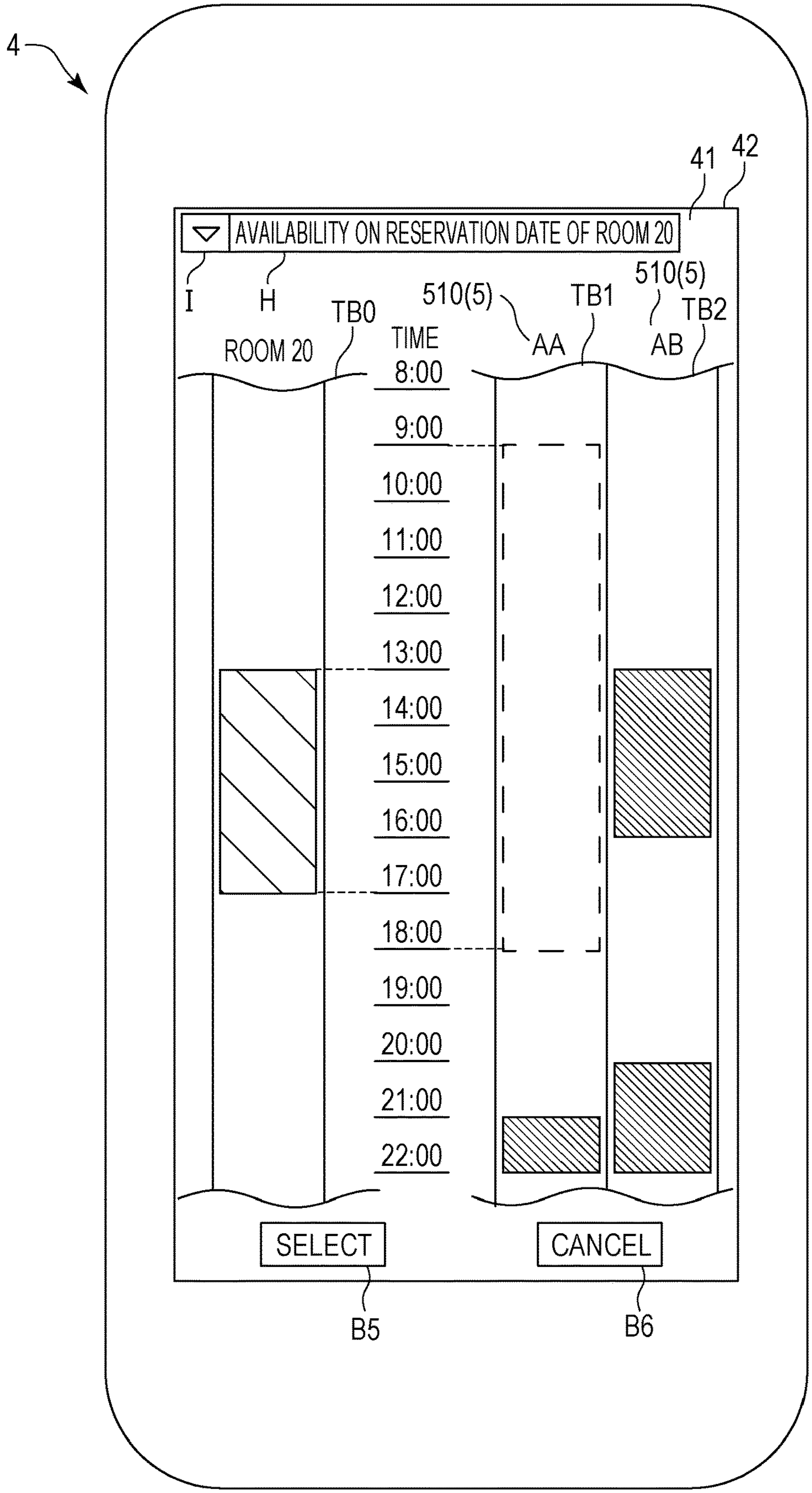
FIG. 7 is a diagram illustrating the availability of the plurality of storage compartments in the hourly rental facility management system.

FIG. 4 is a flowchart illustrating the operation of making reservations in the hourly rental facility management system 1. Moreover, FIG. 5 is a schematic diagram illustrating a state where the location information of the storage means 5 in the hourly rental facility management system 1 is being displayed on the display 42. Moreover, FIG. 6 is a schematic diagram illustrating a state where the attribute information of the plurality of storage compartments 510 and 520 in the hourly rental facility management system 1 is being displayed on the display 42. Moreover, FIG. 7 is a diagram illustrating the availability of the plurality of storage compartments 510 and 520 in the hourly rental facility management system 1. The operation of reserving the room 20 and the storage means 5 in the hourly rental facility management system 1 is described below, using FIGS. 4 to 7.

As illustrated in FIG. 4, first, a user selects the room 20 (refer to FIG. 1) that the user desires to reserve, inputs user information and facility reservation information from the input unit 41, and reserves the room 20 via the facility reservation accepting unit 31. The facility reservation accepting unit 31 executes a facility reservation accepting step of storing, in the storage unit 30, the user information and the facility reservation information, which have been inputted by the user via the input unit 41, and accepting the reservation for the room 20 (step ST01). In the embodiment, a description is given, assuming that the user has made a reservation to use the room 20 from 1 to 5 p.m. on a certain date.

Next, the storage reservation accepting unit 32 displays, on the display 42, a screen (not illustrated) for inquiring the user whether or not to reserve the storage means 5, and determines whether or not to have accepted the user's selection via the input unit 41 (step ST02). If the user selects to reserve the storage means 5 (YES in step ST02), the location information display unit 321 executes a location information display step of acquiring the location information of the first storage means 51 and the second storage means 52 from the storage unit 30, and causing the display 42 to display the location information (step ST03). If the user selects to not reserve the storage means 5 (NO in step ST02), the release key issuing unit 7 executes a release key issuing step (step ST11) of issuing a release key to the user. The operation of reserving the room 20 and the storage means 5 ends.

As illustrated in FIG. 5, the location information display unit 321 displays the location information of the first storage means 51 and the location information of the second storage means 52 on a map M in the location information display step (step ST03). The availability display unit 323 displays, on the display 42, the availability of the first storage means 51 and the availability of the second storage means 52 in the time period during which the room 20 is reserved. Specifically, if there is a storage compartment available among the plurality of storage compartments 510 and 520, a white marker is displayed on the map M as the location information of the storage means 5, and if all of the plurality of storage compartments 510 and 520 are in use, a black marker is displayed on the map M as the location information.

In the embodiment, the first storage means 51 is displayed with the white marker on the map M, and the second storage means 52 is displayed with the black marker on the map M. The marker displayed on the map M can be of any color and shape. As long as the location information and availability of the storage means 5 can be displayed on the display 42, any kind of marker is acceptable. Moreover, in the location information display step (step ST03), a select button B1 that accepts a decision on the selection of the storage means 5, and a cancel button B2 that cancels the reservation for the storage means 5 are displayed on the display 42.

After the location information of the storage means 5 is displayed on the display 42 in the location information display step (step ST03), the storage reservation accepting unit 32 determines whether or not the storage means 5 has been selected (step ST04). The embodiment is described, assuming that the user selects the first storage means 51 having a storage compartment available among the plurality of storage compartments 510 and 520 by touching the white marker via the input unit 41 to make the first storage means 51 selected, and then pressing the select button B1. It is also configured in such a manner that the user can select the second storage means 52 having no storage compartment available among the plurality of storage compartments 510 and 520 by touching the black marker via the input unit 41 to make the second storage means 52 selected, and then pressing the select button B1.

If the user selects the first storage means 51 and presses the select button B1 (YES in step ST04), the storage compartment information display unit 322 executes a storage compartment information display step of acquiring the attribute information from the storage unit 30 and causing the display 42 to display the attribute information as illustrated in FIG. 4 (step ST05). If the cancel button B2 illustrated in FIG. 5 is pressed (NO in step ST04), the release key issuing unit 7 executes the release key issuing step (step ST11) of issuing a release key to the user. The operation of reserving the room 20 and the storage means 5 ends.

In the storage compartment information display step (step ST05), the storage compartment information display unit 322 causes the display 42 to display the arrangement of the first storage compartments 510 and the second storage compartments 520 in the first storage means 51, and the difference in the size of the storage space as the attributes of the storage compartments 510 and 520 as illustrated in FIG. 6. Moreover, in the storage compartment information display step (step ST05), a select button B3 that accepts a decision on the selection of the storage compartment 510 or 520, and a cancel button B4 that cancels the reservation for the storage compartment 510 or 520 are displayed on the display 42.

Two first storage compartments 510 are provided in the first storage means 51. A label AA and a label AB are assigned respectively to the two first storage compartments 510, as labels each indicating a respective first storage compartment 510. Moreover, six second storage compartments 520 are provided in the first storage means 51. A label BA, a label BB, a label BC, a label BD, a label BE, and a label BF are assigned respectively to the six second storage compartments 520, as labels each indicating a respective second storage compartment 520.

The storage compartment information display unit 322 acquires the attribute information from the storage unit 30, and causes the display 42 to display the size of the storage space of the first storage compartment 510 and the size of the storage space of the second storage compartment 520. Specifically, the storage compartment information display unit 322 causes the display 42 to display the second storage compartment 520 smaller than the first storage compartment 510 to visually show the difference in the size of the storage space between the first storage compartment 510 and the second storage compartment 520. Moreover, the storage compartment information display unit 322 causes the display 42 to display graphics of the storage compartments 510 and 520 with their respective labels assigned to visually show the arrangement of the first storage compartments 510 and the arrangement of the second storage compartments 520. The embodiment is described, assuming that the user selects the first storage compartment 510 with the label AA assigned.

As illustrated in FIG. 4, after the attribute information of the storage compartments 510 and 520 is displayed on the display 42 in the storage compartment information display step (step ST05), the storage reservation accepting unit 32 determines whether or not the storage compartment 510 or 520 has been selected (step ST06). The embodiment is described, assuming that the user selects the first storage compartment 510 with the label AA assigned by touching the first storage compartment 510 with the label AA assigned via the input unit 41 to make the first storage compartment 510 with the label AA assigned selected, and then pressing the select button B3 (refer to FIG. 6). If the first storage compartment 510 with the label AA assigned is selected (YES in step ST06), the availability display unit 323 executes an availability display step of displaying the availability of the first storage compartment 510 on the display 42 (step ST07). If the cancel button B4 illustrated in FIG. 6 is pressed (NO in step ST06), the release key issuing unit 7 executes the release key issuing step (step ST11) of issuing a release key to the user. The operation of reserving the room 20 and the storage means 5 ends.

As illustrated in FIG. 4, after the availability of the first storage compartment 510 is displayed on the display 42 in the availability display step (step ST07), the storage compartment selection unit 324 executes a storage compartment selection step of allowing the user to select the storage compartment 510 or 520 from the storage compartments 510 and 520 displayed on the display 42 by the availability display unit 323 (step ST08). Specifically, as illustrated in FIG. 7, in the availability display step (step ST07), a date display portion H where the reservation date of the room 20 reserved in the facility reservation accepting step (step ST01) is displayed, a facility reservation timetable TB0 where the time period during which the room 20 is reserved is displayed, a first availability table TB1 that shows the availability of the first storage compartment 510 with the label AA assigned, and a second availability table TB2 that shows the availability of the first storage compartment 510 with the label AB assigned, which has the same attribute as the first storage compartment 510 with the label AA assigned, are displayed on the display 42. Moreover, a select button B5 that accepts a decision on a reservation time for the storage compartment 510 or 520, and a cancel button B6 that cancels the reservation for the storage compartment 510 or 520 are displayed on the display 42.

The availability display unit 323 is configured in such a manner as to also be able to check the availability of the other first storage compartment 510 having the same storage space size (attribute) by displaying, on the display 42, not only the first availability table TB1 showing the availability of the selected first storage compartment 510 with the label AA assigned, but also the second availability table TB2 showing the availability of the unselected first storage compartment 510 adjacent to the first availability table TB1. In FIG. 7, hatched areas indicate time periods that are already reserved in the first availability table TB1 and the second availability table TB2.

If the user selects and reserves the first storage compartment 510, for example, from 9 a.m. to 6 p.m. in a region enclosed with a broken line in the drawing, the first storage compartment 510 with the label AB assigned is already reserved from 1 to 4 p.m. according to the second availability table TB2. Therefore, the user cannot reserve the first storage compartment 510 from 9 a.m. to 6 p.m. as desired. On the other hand, the first storage compartment 510 with the label AA assigned is not reserved from 9 a.m. to 6 p.m. according to the first availability table TB1. The user touches, via the input unit 41, the time period from 9 a.m. to 6 p.m. indicated by the broken line in the first availability table TB1 of the first storage compartment 510 with the label AA assigned to make the time period selected, presses the select button B5 (refer to FIG. 7), and therefore can specify a time for the first storage compartment 510 with the label AA assigned, and reserve the first storage compartment 510 with the label AA assigned. The date display portion H includes a date selection portion I. The date selection portion I is operated to allow the user to select a date other than the date of the reservation for the room 20, and display the availability of the storage means 5.

As illustrated in FIG. 4, after the storage compartment selection step (step ST08) is executed, the storage reservation accepting unit 32 determines whether or not a reservation time for the storage compartment 510 or 520 has been selected (step ST09). If the user touches a reservation time, makes the reservation time selected, and presses the select button B5 (refer to FIG. 7) (YES in step ST09), the storage reservation accepting unit 32 executes a storage reservation accepting step of accepting a reservation for the first storage compartment 510 with the label AA assigned in association with the user information (step ST10). If the cancel button B6 illustrated in FIG. 7 is pressed (NO in step ST09), the release key issuing unit 7 executes the release key issuing step (step ST11) of issuing a release key to the user. The operation of reserving the room 20 and the storage means 5 ends.

In this manner, if the user does not select to reserve the storage means 5 (NO in step ST02), if the cancel button B2, B4, or B6 is pressed in step ST04, ST06, or ST09, or after the storage reservation accepting step (step ST10) is executed, the release key issuing unit 7 executes the release key issuing step (step ST11) of issuing a release key to the user. The operation of reserving the room 20 and the storage means 5 ends.

In this manner, the hourly rental facility management system 1 enables making a reservation for the storage means 5 in addition to a reservation for the room 20 being the hourly rental facility, and allows a user to check availability and reserve the storage means 5. Therefore, in addition to a reservation for the room 20 being the hourly rental facility, a reservation for the storage means 5 can be made. After the room 20 is reserved by the facility reservation accepting unit 31, the storage reservation accepting unit 32 makes a reservation for the storage means 5 in association with the user information inputted by the facility reservation accepting unit 31, but may make a reservation for the storage means 5 concurrently with a reservation for the room 20. Moreover, the storage reservation accepting unit 32 makes a reservation for the storage means 5 immediately after the room 20 is reserved by the facility reservation accepting unit 31 as in the above-mentioned flowchart, but may make a reservation for the storage means 5 after a release key is issued in the release key issuing step (step ST11). Moreover, the cancel buttons B2, B4, and B6 may be each pressed to return to a respective previous step.

According to such a first embodiment, the following operations and effects can be exerted:

(1) The hourly rental facility management system 1 includes the availability display unit 323, and the storage reservation accepting unit 32 that stores storage reservation information in the storage unit 30 in association with user information. Therefore, when reserving the room 20, a user can check the availability of the storage means 5, and reserve the storage means 5 in addition to the room 20 by use of common user information. Hence, the hourly rental facility management system 1 can reserve the storage means 5 in addition to the room 20.

(2) The storage reservation accepting unit 32 can reserve the storage means 5 also for a reservation date and time different from a reservation date and time of the room 20. Therefore, for example, the user can go out with his/her baggage left until the reservation date and time of the hourly rental facility, and store, for example, a necessary device until the user uses the room 20 next time.

(3) The release key issuing unit 7 issues a release key that can release both of the facility-side lock device 22 and the storage-side lock device 50. Therefore, the user can release both of the facility-side lock device 22 and the storage-side lock device 50 with one release key. Hence, an improvement in convenience can be promoted.

(4) The changer 10 can change at least one of the usage fee of the storage means 5 and the usage period of the storage means 5 on the basis of the predetermined conditions such as a usage attribute indicating that, for example, a user is a VIP, a usage situation, and a use season, which allows encouraging the user to use the room 20.

(5) The management server 3 includes the total calculator 11 and the payment accepting unit 12. Therefore, the user can check the total of the usage fee of the storage means 5 and the usage fee of the room 20 and pay the usage fees in one payment.

(6) The availability display unit 323 displays the availability of the first storage means 51 and the second storage means 52 on the display 42. Therefore, for example, the user can reserve also the first storage means 51 installed with the room 20, or the second storage means 52 installed in a station yard, in association with the room 20. Moreover, the user can select and reserve the first storage means 51 or the second storage means 52.

(7) The storage reservation accepting unit 32 includes the storage compartment information display unit 322. Therefore, the user can select and reserve the storage compartment 510 or 520 having an attribute that the user desires to use from the plurality of storage compartments 510 and 520 displayed on the display 42.

Second Embodiment

A second embodiment of the present disclosure is described below on the basis of the drawings. In the following description, the same reference signs are assigned to parts already described, and descriptions thereof are omitted.

Figure 8:
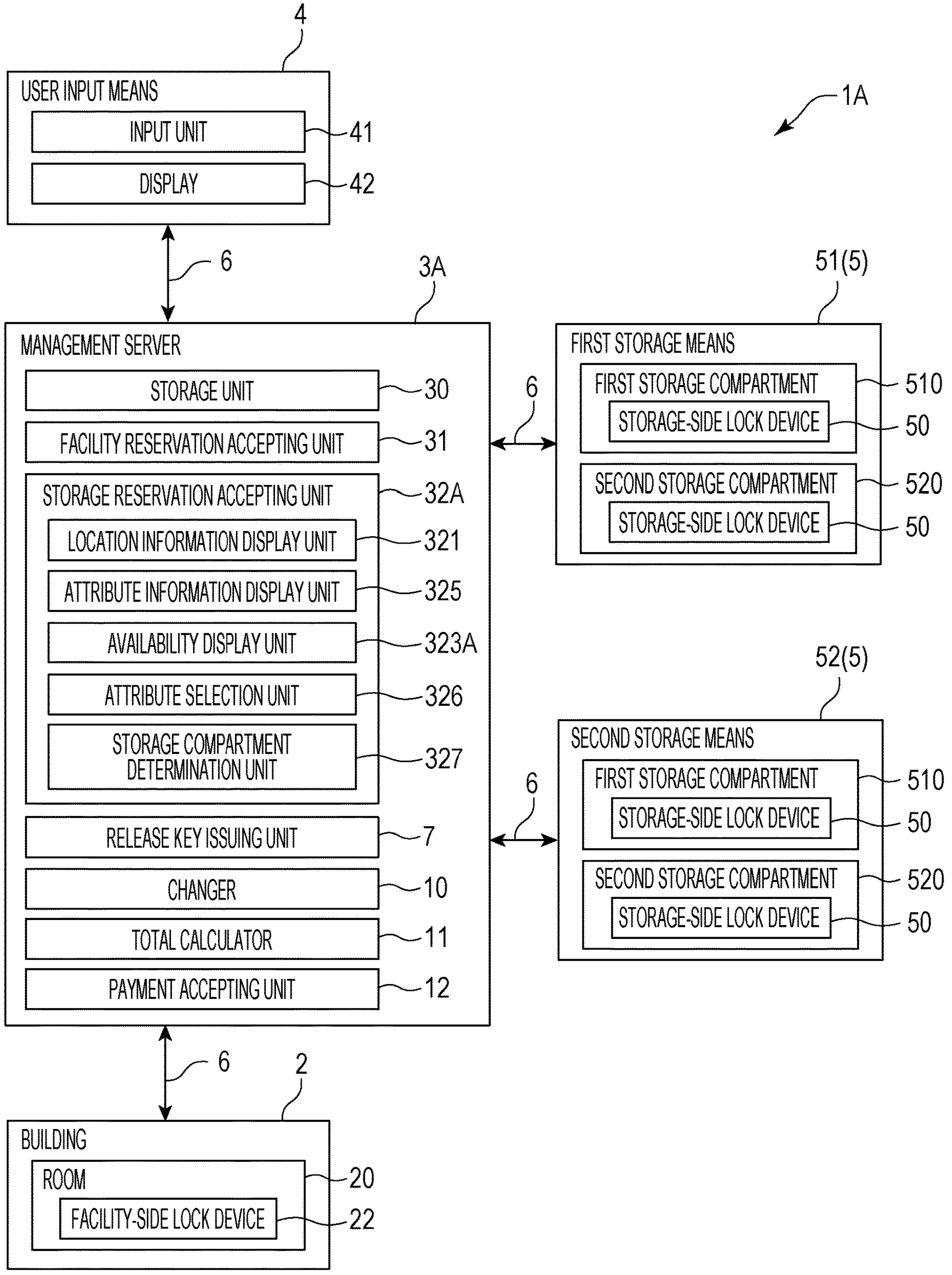
FIG. 8 is a block diagram illustrating the configuration of an hourly rental facility management system according to a second embodiment of the present disclosure.

FIG. 8 is a block diagram illustrating the configuration of an hourly rental facility management system 1A according to the second embodiment of the present disclosure.

In the first embodiment, the storage reservation accepting unit 32 in the management server 3 includes the location information display unit 321, the storage compartment information display unit 322, the availability display unit 323, and the storage compartment selection unit 324. As illustrated in FIG. 8, the second embodiment is different from the first embodiment in the respect that a storage reservation accepting unit 32A in a management server 3A does not include the storage compartment information display unit 322 and the storage compartment selection unit 324, but includes an attribute information display unit 325, an attribute selection unit 326, and a storage compartment determination unit 327.

The attribute information display unit 325 acquires the attribute information from the storage unit 30, and causes the display 42 to display the attribute information of the plurality of storage compartments 510 and 520 on an attribute basis. The attribute selection unit 326 causes a user to select attributes from the attributes displayed on the display 42. The storage compartment determination unit 327 determines the storage compartment 510 or 520 that the user is allowed to use, on the basis of the attributes selected by the user.

Figure 9:
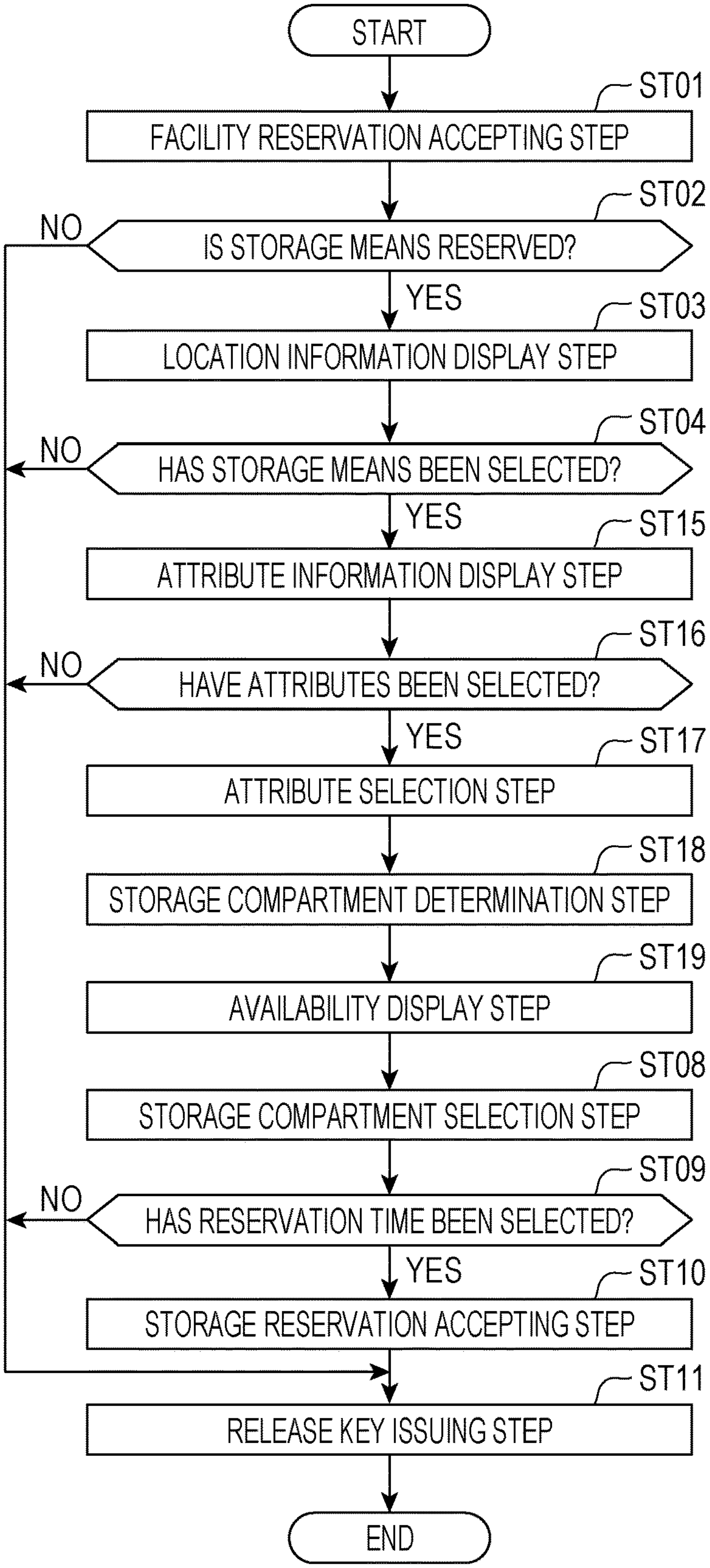
FIG. 9 is a flowchart illustrating the operation of making reservations in the hourly rental facility management system.
Figure 10:
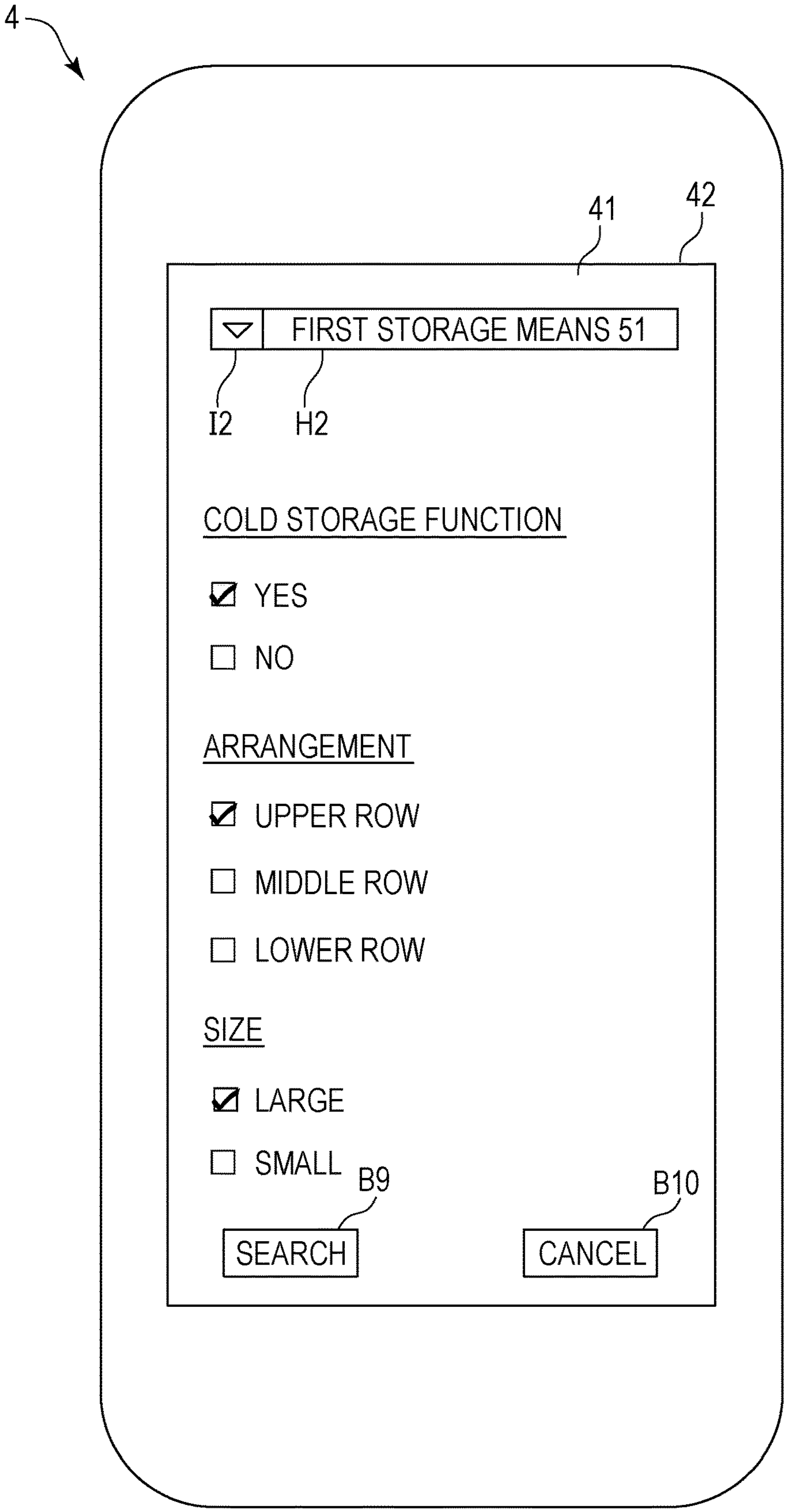
FIG. 10 is a schematic diagram illustrating a state where attribute information of a storage means in the hourly rental facility management system is being displayed on a display.

FIG. 9 is a flowchart illustrating the operation of making reservations in the hourly rental facility management system 1A. Moreover, FIG. 10 is a schematic diagram illustrating a state where the attribute information of the storage means 5 in the hourly rental facility management system 1A is being displayed on the display 42. The operation of reserving the room 20 and the storage means 5 in the hourly rental facility management system 1A is described below by use of FIGS. 9 and 10.

As illustrated in FIG. 9, first, the facility reservation accepting unit 31 executes a facility reservation accepting step of storing the user information and the facility reservation information, which have been inputted by the user via the input unit 41, in the storage unit 30 and accepting a reservation for the room 20, the facility reservation accepting step being similar to the first embodiment (step ST01). Next, the storage reservation accepting unit 32 displays, on the display 42, a screen (not illustrated) for inquiring the user whether or not to reserve the storage means 5, and determines whether or not to have accepted the user's selection via the input unit 41 (step ST02).

If the user selects to reserve the storage means 5 (YES in step ST02), the location information display unit 321 executes a location information display step of acquiring the location information of the first storage means 51 and the second storage means 52 from the storage unit 30, and causing the display 42 to display the location information (step ST03). If the user selects to not reserve the storage means 5 (NO in step ST02), the release key issuing unit 7 executes a release key issuing step (step ST11) of issuing a release key to the user. The operation of reserving the room 20 and the storage means 5 ends.

As illustrated in FIG. 5, the location information display unit 321 displays the location information of the first storage means 51 and the location information of the second storage means 52 on the map M in the location information display step (step ST03). After the location information of the storage means 5 is displayed on the display 42 in the location information display step (step ST03), the storage reservation accepting unit 32 determines whether or not the storage means 5 has been selected (step ST04). The embodiment is described, assuming that the user selects the first storage means 51 having a storage compartment available among the plurality of storage compartments 510 and 520 by touching the white marker via the input unit 41 to make the first storage means 51 selected, and then pressing the select button B1. If the user selects the first storage means 51 and presses the select button B1 (YES in step ST04), the attribute information display unit 325 executes an attribute information display step of acquiring the attribute information from the storage unit 30 and causing the display 42 to display the attribute information as illustrated in FIG. 9 (step ST15). If the cancel button B2 illustrated in FIG. 5 is pressed (NO in step ST04), the release key issuing unit 7 executes the release key issuing step (step ST11) of issuing a release key to the user. The operation of reserving the room 20 and the storage means 5 ends.

Specifically, as illustrated in FIG. 10, the attribute information display unit 325 displays the attribute information related to the plurality of storage compartments 510 and 520 on an attribute basis. The attribute information includes checkboxes, as the attribute selection unit 326, that each allow the user to select an attribute. The user touches the checkboxes to check the boxes, and accordingly makes selections from the attributes of the plurality of storage compartments 510 and 520. Moreover, a search button B9 that accepts a search for the storage compartment 510 or 520 on the basis of the selected attributes of the storage compartment 510 or 520, and a cancel button B10 that cancels a reservation for the storage compartment 510 or 520 are displayed on the display 42.

As illustrated in FIG. 9, after the attribute information display step (step ST15) is executed, the storage reservation accepting unit 32A determines whether or not the user has selected the attributes (step ST16). In the embodiment, the user can make selections from the attributes of the plurality of storage compartments 510 and 520 by touching the checkboxes (attributes) via the input unit 41, makes the checkboxes selected, and then pressing the search button B9 (refer to FIG. 10). If the user has selected the attributes (YES in step ST16), the attribute selection unit 326 executes an attribute selection step on the basis of the selected attribute information (step ST17). If the cancel button B10 illustrated in FIG. 10 is pressed (NO in step ST16), the release key issuing unit 7 executes the release key issuing step (step ST11) of issuing a release key to the user. The operation of reserving the room 20 and the storage means 5 ends.

After the attributes are selected in the attribute selection step (step ST17), the storage compartment determination unit 327 executes a storage compartment determination step of determining the storage compartment 510 or 520 that the user is allowed to use, on the basis of the attributes selected by the user (step ST18). For example, if, as illustrated in FIG. 10, the user makes selections from the attributes of the plurality of storage compartments 510 and 520 by selecting "yes" for a cold storage function attribute, "upper row" for an arrangement attribute, and "large" for a size attribute, and pressing the search button B9 (refer to FIG. 10), the storage compartment determination unit 327 allocates and determines the first storage compartment 510 with the label AA assigned, on the basis of the attributes selected by the user.

After the storage compartment 510 or 520 that the user is allowed to use is determined in the storage compartment determination step (step ST18), an availability display unit 323A executes an availability display step of displaying the availability of the plurality of storage compartments 510 and 520 as illustrated in FIG. 9 (step ST19). Specifically, the availability display unit 323A displays the availability of the storage compartment 510 or 520 determined in the storage compartment determination step (step ST18) as in the availability display step (step ST07) in the first embodiment (refer to FIG. 7). The management server 3A then executes the procedure in step ST08 and subsequent steps as in the first embodiment.

In the embodiment, after determining the storage compartment 510 or 520 that the user is allowed to use in the storage compartment determination step (step ST18), the management server 3A further executes the availability display step (step ST19), and allows the user to make a final selection of the storage compartment 510 or 520, and select a reservation time, and accordingly executes a storage reservation accepting step (step ST10) of accepting a reservation for the storage means 5. In contrast, for example, it may be configured in such a manner that the management server 3A sets a reservation time attribute as an attribute that can be selected, in the attribute selection step (step ST17), and accepts a reservation for the storage means 5 without allowing the user to make a final selection of the storage compartment 510 or 520 and to select a reservation time.

After the room 20 is reserved by the facility reservation accepting unit 31, the storage reservation accepting unit 32A makes a reservation for the storage means 5 in association with the user information inputted by the facility reservation accepting unit 31 as in the first embodiment. However, a reservation for the storage means 5 may be made concurrently with a reservation for the room 20. Moreover, the storage reservation accepting unit 32A makes a reservation for the storage means 5 immediately after the room 20 is reserved by the facility reservation accepting unit 31 as in the above-mentioned flowchart. However, a reservation for the storage means 5 may be made after a release key is issued in the release key issuing step (step ST11). Moreover, the cancel button B10 may be pressed to return to a previous step.

Operations and effects similar to (1) to (7) in the first embodiment can also be exerted in such a second embodiment. In addition, the following operations and effects can be exerted:

(8) The storage reservation accepting unit 32A includes the attribute information display unit 325, the attribute selection unit 326, and the storage compartment determination unit 327. Therefore, a user can reserve the storage compartment 510 or 520 having desired attributes by selecting the attributes of the storage compartment 510 or 520 that the user desires to use from the plurality of storage compartments 510 and 520 displayed on the display 42. Moreover, the storage reservation accepting unit 32A includes the storage compartment determination unit 327 and therefore can allocate and determine the storage compartment 510 or 520 used by the user on the basis of the attributes selected by the user.

Third Embodiment

A third embodiment of the present disclosure is described below on the basis of the drawings. In the following description, the same reference signs are assigned to parts already described, and descriptions thereof are omitted.

Figure 11:
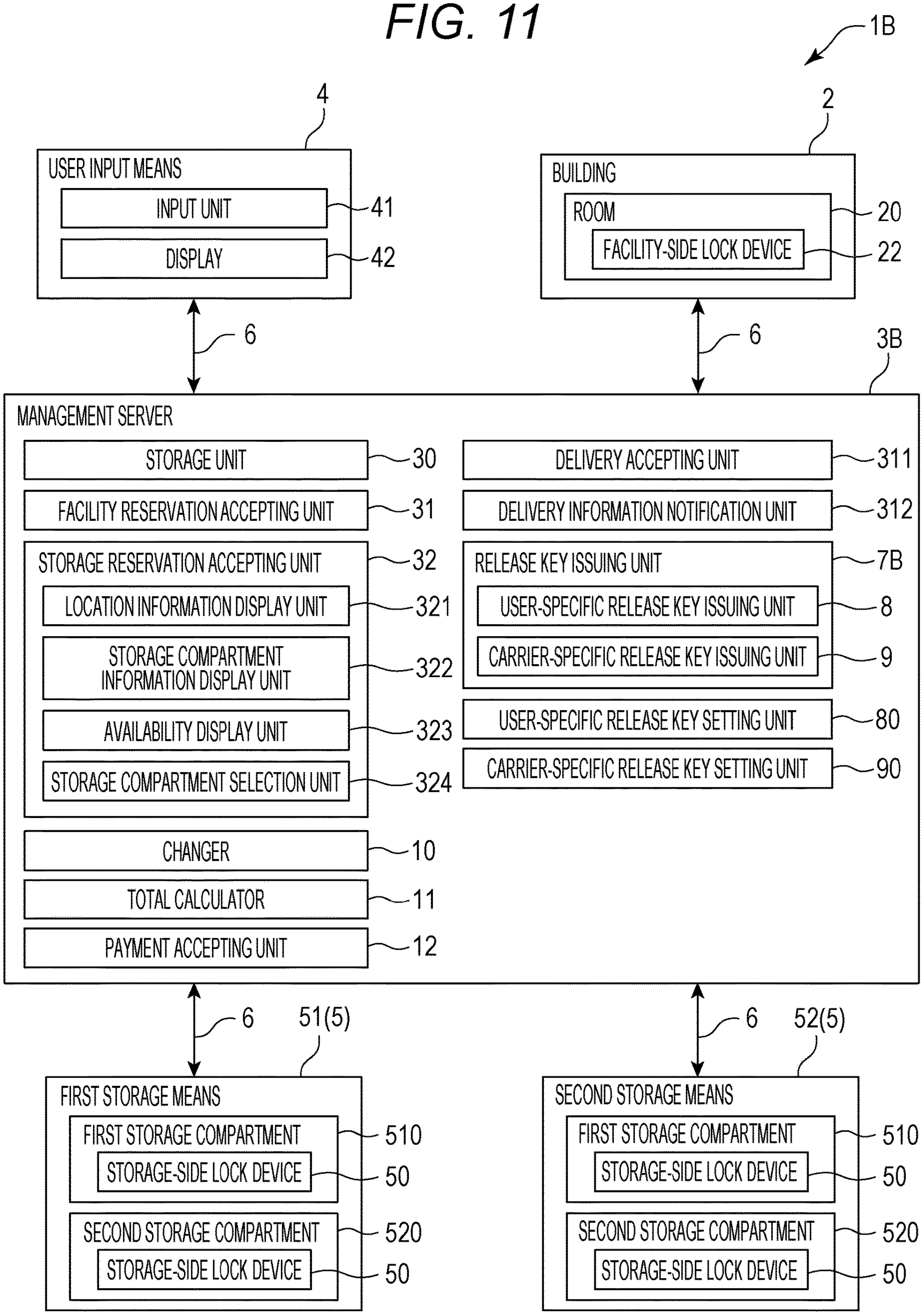
FIG. 11 is a block diagram illustrating the configuration of an hourly rental facility management system according to a third embodiment of the present disclosure.

FIG. 11 is a block diagram illustrating the configuration of an hourly rental facility management system 1B according to the third embodiment of the present disclosure. As illustrated in FIG. 11, a release key issuing unit 7B in the third embodiment is different from the first embodiment in the respect that the release key issuing unit 7B includes a user-specific release key issuing unit 8 and a carrier-specific release key issuing unit 9. Moreover, a management server 3B in the third embodiment is different from the first embodiment in the respect that the management server 3B further includes a delivery accepting unit 311, a delivery information notification unit 312, a user-specific release key setting unit 80, and a carrier-specific release key setting unit 90.

The delivery accepting unit 311 accepts the delivery of goods to the storage means 5 reserved by a user, via the input unit 41. The user may request to pick up goods at the storage means 5 via the delivery accepting unit 311, and the delivery accepting unit 311 may accept pickup information related to the accepted pickup of the goods.

The delivery information notification unit 312 notifies the storage means 5 being a delivery destination, and a release key of the storage-side lock device 50 to a carrier related to the delivery of the goods. Delivery information includes a delivery destination such as the location information and arrangement information of the storage means 5 reserved by the user, the release key of the storage-side lock device 50, and a shipping date and time. The delivery information notification unit 312 may notify the pickup information to the carrier related to the delivery of the goods when the delivery accepting unit 311 accepts the pickup.

The user-specific release key issuing unit 8 issues, to the user, the release key of the storage means 5 reserved by the user as a user-specific release key. Moreover, the user-specific release key issuing unit 8 issues a use-specific release key that includes a character string and can release both of the facility-side lock device 22 of the room 20 and the storage-side lock device 50. The carrier-specific release key issuing unit 9 issues, to the carrier, a carrier-specific release key that the carrier uses when releasing the storage means 5 reserved by the user. Moreover, the carrier-specific release key issuing unit 9 issues a carrier-specific release key including a part of the character string in the user-specific release key. The user-specific release key and the carrier-specific release key are different release keys.

Specifically, for example, the user-specific release key issuing unit 8 issues a character string "AB0123" as the user-specific release key for the facility-side lock device 22 and the storage-side lock device 50. The carrier-specific release key issuing unit 9 issues a character string "CD0123" as the carrier-specific release key for the storage-side lock device 50. In this manner, the carrier-specific release key includes a part, "0123", of the character string in the user-specific release key.

The facility-side lock device 22 accepts the input of a six-character string. The facility-side lock device 22 is released when the six-character string that has been inputted matches all the six characters in the character string, "AB0123", of the user-specific release key. The storage-side lock device 50 accepts the input of a six-character string as in the facility-side lock device 22. However, in contrast to the facility-side lock device 22, the storage-side lock device 50 is released when the last four characters of the inputted character string matches "0123".

In other words, the facility-side lock device 22 can be released only by the character string, "AB0123", of the user-specific release key, and the storage-side lock device 50 can be released by both of the character string, "AB0123", of the user-specific release key and the character string, "CD0123", of the carrier-specific release key. In this manner, the facility-side lock device 22 cannot be released by the carrier-specific release key. Therefore, an improvement in security can be promoted.

The user-specific release key setting unit 80 activates or deactivates the user-specific release key on the basis of a predetermined condition. Specifically, the user-specific release key setting unit 80 makes the user-specific release key active for the duration of the reservations of the room 20 and the storage means 5, and makes the user-specific release key inactive before and after the reservation times of the room 20 and the storage means 5. The carrier-specific release key setting unit 90 activates or deactivates the carrier-specific release key on the basis of a predetermined condition. Specifically, the carrier-specific release key setting unit 90 makes the carrier-specific release key active for the duration of the reservation of the storage means 5, and makes the carrier-specific release key inactive before and after the reservation time of the storage means 5. In other words, the carrier-specific release key setting unit 90 deactivates the carrier-specific release key at times other than a specified time.

Operations and effects similar to the first embodiment can also be exerted in such a third embodiment. In addition, the following operations and effects can be exerted:

(9) The management server 3B includes the delivery accepting unit 311 and the delivery information notification unit 312. Therefore, a user can have goods delivered to the reserved storage means 5. Moreover, for example, the user does not need to bring, for example, a necessary device that is used in the room 20, and can deliver the device to the specified storage means 5.

(10) A carrier related to the delivery of the goods can pick up the goods on the basis of the pickup information. Therefore, the convenience of the hourly rental facility management system 1B can be improved.

(11) The release key issuing unit 7B includes the user-specific release key issuing unit 8 and the carrier-specific release key issuing unit 9. Therefore, the user-specific release key is issued to the user, and the carrier-specific release key different from the user-specific release key is issued to the carrier. Therefore, troubles such as the carrier taking the user's goods away can be prevented. Moreover, the hourly rental facility management system 1B can promote an improvement in security.

(12) The carrier-specific release key is activated or deactivated on the basis of the predetermined condition. Therefore, the carrier-specific release key can be protected against use by the carrier except when necessary to be used. The security of the storage means 5 can be improved.

(13) The carrier-specific release key setting unit 90 deactivates the carrier-specific release key at times other than a specified time. Therefore, the security of the storage means 5 can be improved.

(14) The carrier-specific release key cannot release the facility-side lock device 22. Therefore, an improvement in security can be promoted.

Modification of Embodiments

The present disclosure is not limited to the embodiments, and includes modifications, improvements, and the like within the bounds where the object of the present disclosure can be achieved. For example, the case where the room 20 of the building 2 is rented as the hourly rental facility is illustrated in the embodiments. However, the hourly rental facility is not limited to a meeting room, a training room, or the like, and may be a tennis court, a baseball stadium, an athletic field, a parking lot, or the like, which is outdoor space, or may be a karaoke room, a rental office space, a reading space, a rental car, a rental bicycle, or the like.

Figure 12:
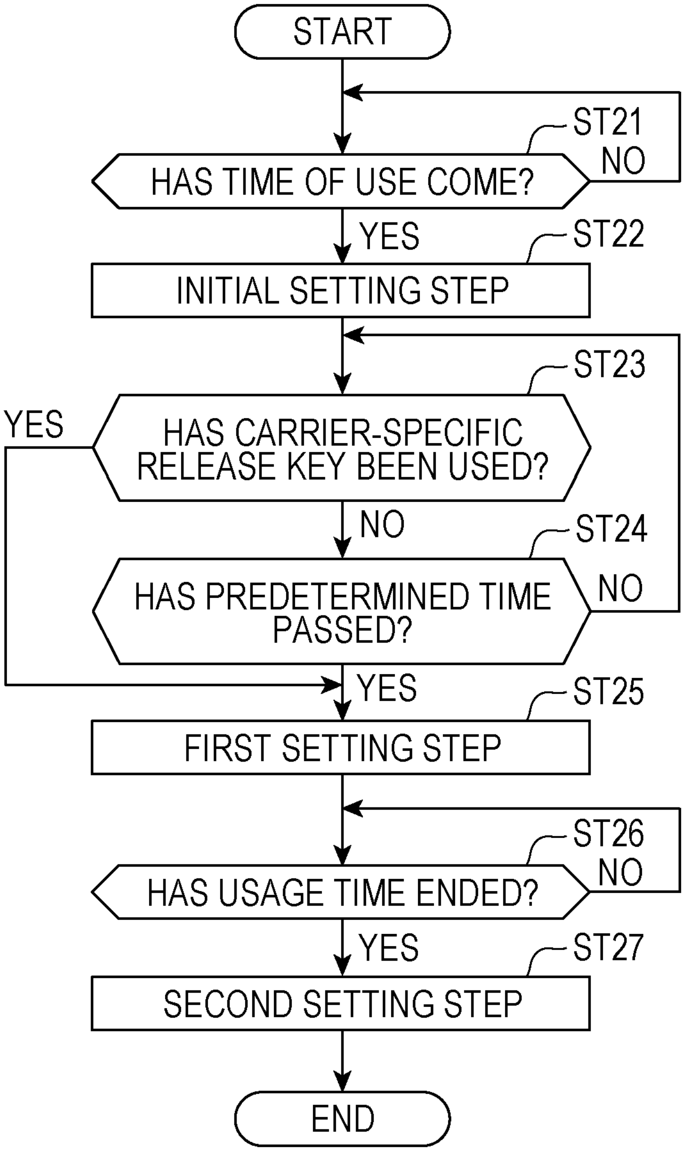
FIG. 12 is a flowchart illustrating a method for setting a release key of a storage-side lock device in an hourly rental facility management system according to a modification of the present disclosure.

FIG. 12 is a flowchart illustrating a method for setting a release key of a storage-side lock device in an hourly rental facility management system according to a modification of the present disclosure. In the third embodiment, the user-specific release key issuing unit 8 issues a user-specific release key that includes a character string and can release both of the facility-side lock device 22 and the storage-side lock device 50. Moreover, the carrier-specific release key issuing unit 9 issues, to a carrier, a carrier-specific release key that the carrier uses when releasing the storage means 5 reserved by a user. The user-specific release key and the carrier-specific release key are different release keys. In other words, the storage-side lock device 50 is configured in such a manner that a plurality of types of release keys can be set thereon. In contrast, the modification is different from the third embodiment in the respect that the storage-side lock device is configured in such a manner that one release key can be set thereon.

In the modification, the carrier-specific release key setting unit 90 deactivates the carrier-specific release key at times other than a specified time as in the third embodiment. Moreover, the carrier-specific release key setting unit 90 deactivates the carrier-specific release key after the carrier-specific release key is used. The user-specific release key setting unit 80 sets the user-specific release key to active after the carrier-specific release key is deactivated. The method for setting a release key for the storage-side lock device 50 is described below on the basis of FIG. 12.

As illustrated in FIG. 12, first, the user-specific release key setting unit 80 and the carrier-specific release key setting unit 90 determine whether or not the time of use of the storage means 5 reserved by the user has come (step ST21). If it is determined that the time of use of the storage means 5 has come (YES in step ST21), an initial setting step is executed in which the carrier-specific release key setting unit 90 sets the carrier-specific release key to active, and the user-specific release key setting unit 80 sets the user-specific release key to inactive (step ST22). If it is determined that the time of use of the storage means 5 has not come (NO in step ST21), the determination in step ST21 is executed until the time of use of the storage means 5 comes.

Next, the carrier-specific release key setting unit 90 determines whether or not the carrier-specific release key has been used on the storage-side lock device 50 (step ST23). If it is determined that the carrier-specific release key has been used on the storage-side lock device 50 (YES in step ST23), the carrier-specific release key setting unit 90 executes a first setting step described below (step ST25). If it is determined that the carrier-specific release key has not been used on the storage-side lock device 50 (NO in step ST23), the carrier-specific release key setting unit 90 determines whether or not a predetermined time has passed (step ST24). The predetermined time indicates a preset time limit within which the storage means 5 reserved by the user can be used, for example, one hour from the start of use.

If determining that the predetermined time has passed (YES in step ST24), the carrier-specific release key setting unit 90 executes the first setting step described below (step ST25). If determining that the predetermined time has not passed (NO in step ST24), the carrier-specific release key setting unit 90 executes the determinations in steps ST23 and ST24 until the predetermined time passes.

If determining that the carrier-specific release key has been used on the storage-side lock device 50 (YES in step ST23), or if determining that the predetermined time has passed (YES in step ST24), the first setting step is executed in which the carrier-specific release key setting unit 90 sets the carrier-specific release key to inactive, and the user-specific release key setting unit 80 sets the user-specific release key to active (Step ST25). The user-specific release key setting unit 80 determines whether or not it is within the usage time of the storage means 5 (step ST26). If it is determined that it is within the usage time of the storage means 5 (NO in step ST26), the determination of step ST26 is repeated. If determining that it is not within the usage time of the storage means 5 (YES in step ST26), the user-specific release key setting unit 80 executes a second setting step of setting the user-specific release key to inactive (Step ST27). The procedure related to the setting of the release key of the storage-side lock device 50 ends.

According to such a configuration, the user-specific release key becomes active (available) after the carrier-specific release key becomes inactive. The carrier-specific release key can be made unavailable. Consequently, even if only one release key can be set for the storage-side lock device 50, it is possible to protect the release key against use by a carrier except when necessary to be used and to improve the security of the storage means 5. Moreover, the carrier-specific release key setting unit 90 deactivates the carrier-specific release key that has once been used on the storage means 5. Therefore, it is possible to protect a carrier-specific release key against use by a carrier except when necessary to be used and to improve the security of the storage means 5.

In the third embodiment, the hourly rental facility management system 1B accepts the delivery of goods to the storage means 5 through the delivery accepting unit 311 and the delivery information notification unit 312. However, the hourly rental facility management system may accept the collection of goods in the storage means. Specifically, the management server includes a collection accepting unit that accepts the collection of goods in the storage means reserved by a user, a release key issuing unit that issues a release key that releases the storage-side lock device of the storage means being a collection destination, and a collection information notification unit that notifies the storage means being the collection destination, and the release key to a carrier related to the collection of the goods. Moreover, the collection accepting unit may accept shipping information related to the shipping of the goods, and the collection information notification unit may notify the shipping information to the carrier related to the collection of the goods.

According to such a configuration, the management system includes the collection accepting unit and the collection information notification unit. Therefore, the user can have the goods in the reserved storage means collected. Moreover, for example, the user does not need to take, for example, a necessary device used in the hourly rental facility back with him/her and can have the device collected from the reserved storage means. Moreover, a carrier related to the delivery of goods can deliver the goods on the basis of the shipping information. Therefore, the convenience of the hourly rental facility management system can be improved.

Furthermore, the hourly rental facility management system may accept the delivery and collection of a rental in association with a reservation for the storage means. Specifically, the delivery accepting unit accepts the delivery of a rental as the goods. The delivery information notification unit notifies the storage means being a delivery destination, and a release key to a rental company. The collection accepting unit accepts the collection of the rental as the goods. The collection information notification unit notifies the storage means being a collection destination, and a release key to the rental company. The management server includes a rental information acquisition unit that acquires rental information related to available rentals, a rental information display unit that causes the display to display the rental information, and a rental selection unit that causes the user to select a rental. The rental information acquisition unit may acquire the rental information from the storage unit where the rental information is stored, or may acquire the rental information from a management server of the rental company.

According to such a configuration, the user can select and reserve a rental that the user desires to use, from the rentals displayed on the display. Moreover, the user can have the rental delivered to the reserved storage means, and have the rental in the reserved storage means collected.

Moreover, the above-mentioned pickup information for delivery includes bringing in goods to the carrier as a pickup location. At this point in time, the delivery information notification unit may notify the user of a time limit for bringing in. Furthermore, the pickup information may include another storage means as a pickup location. At this point in time, the delivery information notification unit may notify the carrier of the storage means being a pickup destination, and a release key issued separately. Moreover, the storage means includes a door for the user, and a door for the carrier. The user-specific release key issuing unit may issue a user-specific release key that can unlock the door for the user, and the carrier-specific release key issuing unit may issue a carrier-specific release key that can unlock the door for the carrier. Moreover, the management server may include a charge settlement means having a function of settling a delivery charge, a pickup fee, a collection fee, a shipping cost, a rental fee, and the like that are incurred for renting, delivery, and collection.

The hourly rental facility management system may include a transport means that moves between the hourly rental facility and the storage means and transports goods in addition to the embodiments. When the transport means has completed the delivery of goods including a rental to the storage means, the transport means may transport the goods to the hourly rental facility reserved by a user by a reserved date and time on the basis of a notice of completion and the facility reservation information. The transport means may transport the goods back to the storage means reserved by the user.

In the embodiments, the configuration where the management server 3 is connected to the user input means 4 and the communication terminal device 23 via the Internet 6 being the communication line is illustrated by example. However, the management server may be of a distributed management type. For example, one that uses a distributed ledger, notably a blockchain, can be used. Anything is acceptable as long as it can manage information and also transmit and receive various commands to and from the communication terminal device 23 and process the commands.

In the embodiments, the storage means 5 includes the first storage means 51 and the second storage means 52, but may include three or more storage means, or may include one storage means. Moreover, the storage means 5 includes the plurality of storage compartments 510 and 520, but may not include a plurality of storage compartments. In short, the storage means is simply required to include at least one storage compartment having a predetermined storage space.

In the embodiments, the changer 10, the total calculator 11, and the payment accepting unit 12 are included. However, the management server may not include them. Moreover, in the third embodiment, the user-specific release key and the carrier-specific release key are different release keys, but may be the same release key. Moreover, in the embodiments, the release key issuing units 7 and 7B issue, to a user, a release key that can release both of the facility-side lock device 22 of the room 20 reserved by the user and the storage-side lock device 50 of the storage means 5 reserved by the user. However, the release key issuing unit may issue a release key that can release the facility-side lock device and a release key that can release the storage-side lock device separately.

Moreover, in the first embodiment, the availability display unit 323 displays the availability of the storage means 5 by use of the availability tables TB1 and TB2. However, as long as the availability display unit can display the availability of the storage means, the availability of the storage means can be displayed in any manner.

In the first embodiment, the arrangement of the plurality of storage compartments 510 and 520, the sizes of the storage spaces of the plurality of storage compartments 510 and 520 are used as the attribute information of the plurality of storage compartments 510 and 520. However, the attribute information of the plurality of storage compartments may include the presence or absence of a temperature adjustment function, the shapes of the plurality of storage compartments, and the installed locations of the plurality of storage means.

In the first embodiment, the location information display unit 321 displays, on the display 42, the location information of the first storage means 51 and the second storage means 52. However, the location information display step (step ST03) by the location information display unit 321 may be omitted.

In short, the management server is simply required: to include the storage unit, the facility reservation accepting unit that accepts information on a user who uses the hourly rental facility and facility reservation information including a reservation date and time of the hourly rental facility, via the input unit, and stores the user information and the facility reservation information in the storage unit, the storage reservation accepting unit that accepts a reservation for the storage means including a reservation date and time of the storage means, as storage reservation information, via the input unit, and stores the storage reservation information in the storage unit, and an availability display unit that acquires the storage reservation information from the storage unit and causes the display to display the availability of the storage means; and to allow reserving the storage means in addition to the hourly rental facility.

The foregoing description has been described with reference to specific implementations. However, the illustrative discussions above are not intended to be exhaustive or to limit the claims to the precise forms disclosed. Many variations are possible in view of the above teachings. The implementations were chosen and described to best explain principles of operation and practical applications, to thereby enable others skilled in the art.

The various drawings illustrate a number of elements in a particular order. However, elements that are not order dependent may be reordered and other elements may be combined or separated. While some reordering or other groupings are specifically mentioned, others will be obvious to those of ordinary skill in the art, so the ordering and groupings presented herein are not an exhaustive list of alternatives.

As used herein: the singular forms "a" "an," and "the" include the plural forms as well, unless the context clearly indicates otherwise; the term "and/or" encompasses all possible combinations of one or more of the associated listed items; the terms "first," "second," etc. are only used to distinguish one element from another and do not limit the elements themselves; the term "if" may be construed to mean "when," "upon," "in response to," or "in accordance with," depending on the context; and the terms "include," "including," "comprise," and "comprising" specify particular features or operations but do not preclude additional features or operations.

What is claimed is:

1. An hourly rental facility management system including an hourly rental facility to rent the facility to a user after usage time is set, the hourly rental facility management system comprising:
- a management server for managing information with connection to a communication line;
- a user input means configured to accept information input by the user into the management server; and
- a storage means including:
  - at least one storage compartment having a predetermined storage space that stores goods; and
  - a storage-side lock device configured to be released by a release key;

wherein:
- the hourly rental facility, the user input means, and the storage means are connected to the management server via the communication line in such a manner as to be able to communicate with each other;
- the user input means includes:
  - an input unit configured to input information; and
  - a display configured to display information;
- the management server includes:
  - a storage unit configured to store information;
  - a facility reservation accepting unit configured to accept, via the input unit, user information being information related to the user who uses the hourly rental facility, and facility reservation information being information that is related to a reservation for the hourly rental facility and includes a reservation date and time of the hourly rental facility, and then to store the user information and the facility reservation information in the storage unit;
  - a storage reservation accepting unit configured to accept, via the input unit, storage reservation information being information that is related to a reservation for the storage means and includes a reservation date and time of the storage means, and then to store the storage reservation information in the storage unit in association with the user information;
  - a delivery accepting unit configured to accept delivery of goods to the storage means reserved by the user;
  - a release key issuing unit configured to issue a release key that releases the storage-side lock device of the storage means, wherein the release key issuing unit includes:
    - a user-specific release key issuing unit configured to issue the release key of the storage means reserved by the user, as a user-specific release key, to the user; and
    - a carrier-specific release key issuing unit configured to issue, to the carrier, a carrier-specific release key that the carrier uses upon releasing the storage means reserved by the user;
    - wherein the user-specific release key and the carrier-specific release key are different;
  - a release key setting unit configured to activate and deactivate the carrier-specific release key based on a predetermined condition including at least one of (i) a delivery time window associated with the storage reservation and (ii) use of the carrier-specific release key, and to activate the user-specific release key after deactivation of the carrier-specific release key; and
  - a delivery information notification unit configured to notify the storage means being the delivery destination, and the release key to a carrier related to the delivery of the goods;
- the storage reservation accepting unit includes an availability display unit configured to acquire the storage reservation information from the storage unit and then to cause the display to display availability of the storage means.

2. The hourly rental facility management system according to claim 1, wherein:
- the storage means includes a plurality of the storage compartments;
- the storage unit stores attribute information related to attributes of the plurality of storage compartments; and
- the storage reservation accepting unit includes:
  - a storage compartment information display unit configured to acquire the attribute information from the storage unit and then to cause the display to display the attribute information of the plurality of storage compartments on a storage compartment basis; and a storage compartment selection unit configured to allow the user to make a selection from the storage compartments displayed on the display.

3. The hourly rental facility management system according to claim 1, wherein:

the storage means includes a plurality of the storage compartments;

the storage unit stores attribute information related to attributes of the plurality of storage compartments; and the storage reservation accepting unit includes:

an attribute information display unit configured to acquire the attribute information from the storage unit and then to cause the display to display the attribute information of the plurality of storage compartments on an attribute basis;

an attribute selection unit configured to allow the user to make a selection from the attributes displayed on the display; and a storage compartment determination unit configured to determine the storage compartment that is allowed to be used by the user, on the basis of the attribute selected by the user.

4. The hourly rental facility management system according to claim 1, wherein the storage reservation accepting unit accepts a reservation for the storage means also for a reservation date and time different from the reservation date and time accepted by the facility reservation accepting unit.

5. The hourly rental facility management system according to claim 1, wherein:

the delivery accepting unit accepts pickup information related to pick up of the goods; and the delivery information notification unit notifies the pickup information to the carrier related to the delivery of the goods.

6. The hourly rental facility management system according to claim 1, wherein:

the storage means includes a storage-side lock device configured to be released by a release key; and the management server includes:

a collection accepting unit configured to accept collection of goods in the storage means reserved by the user;

a release key issuing unit configured to issue a release key that releases the storage-side lock device of the storage means being a collection destination; and a collection information notification unit configured to notify the storage means being the collection destination, and the release key to a carrier related to the collection of the goods.

7. The hourly rental facility management system according to claim 6, wherein:

the collection accepting unit accepts shipping information related to shipping of the goods; and the collection information notification unit notifies the shipping information to the carrier related to the collection of the goods.

8. The hourly rental facility management system according to claim 1, wherein:

the storage means includes a storage-side lock device configured to be released by a release key;

the management server includes:

a delivery accepting unit configured to accept delivery of goods to the storage means reserved by the user;

a release key issuing unit configured to issue a release key that releases the storage-side lock device of the storage means being a delivery destination;

a delivery information notification unit configured to notify the storage means being the delivery destination, and the release key to a carrier related to the delivery of the goods;

a collection accepting unit configured to accept collection of goods in the storage means reserved by the user;

a release key issuing unit configured to issue a release key that releases the storage-side lock device of the storage means being a collection destination;

a collection information notification unit configured to notify the storage means being the collection destination, and the release key to a carrier related to the collection of the goods;

a rental information acquisition unit configured to acquire rental information related to an available rental;

a rental information display unit configured to cause the display to display the rental information; and a rental selection unit configured to allow the user to select a rental;

the delivery accepting unit accepts delivery of the rental as the goods;

the delivery information notification unit notifies the storage means being the delivery destination, and a release key to a rental company;

the collection accepting unit accepts collection of the rental as the goods; and the collection information notification unit notifies the storage means being the collection destination, and a release key to the rental company.

9. The hourly rental facility management system according to claim 1, wherein:

the management server includes a user-specific release key setting unit configured to activate or deactivate the user-specific release key on the basis of a predetermined condition; and the user-specific release key setting unit sets the user-specific release key to activate after the carrier-specific release key is deactivated.

10. The hourly rental facility management system according to claim 1, wherein:

the hourly rental facility includes a facility-side lock device configured to be released by a release key;

the user-specific release key issuing unit issues the user-specific release key including a character string, the user-specific release key being capable of releasing both of the facility-side lock device and the storage-side lock device; and the carrier-specific release key issuing unit configured to issue the carrier-specific release key including a part of the character string in the user-specific release key.

11. The hourly rental facility management system according to claim 1, wherein:

the hourly rental facility includes a facility-side lock device configured to be released by a release key;

the storage means includes a storage-side lock device configured to be released by a release key;

the management server includes a release key issuing unit configured to issue a release key that releases the storage-side lock device; and the release key issuing unit issues a release key capable of releasing both of the facility-side lock device and the storage-side lock device.

12. The hourly rental facility management system according to claim 1, wherein the management server includes a changer configured to change at least one of a usage fee of the storage means and a usage period of the storage means on the basis of a predetermined condition.

13. The hourly rental facility management system according to claim 1, wherein:

the storage means includes a first storage means installed at a predetermined location, and a second storage means installed at a location different from the first storage means;

the storage unit stores information on locations where the first storage means and the second storage means are installed;

the storage reservation accepting unit includes a location information display unit configured to acquire the location information from the storage unit and then to cause the display to display the location information; and the availability display unit causes the display to display availability of the first and the second storage means.

14. The hourly rental facility management system according to claim 1, wherein the management server includes:

a total calculator configured to calculate the total of the usage fee of the storage means and a usage fee of the hourly rental facility; and a payment accepting unit configured to accept a payment for the total of the usage fees calculated by the total calculator.

* * * * *